(12) United States Patent
Hong et al.

(10) Patent No.: US 10,831,303 B2
(45) Date of Patent: Nov. 10, 2020

(54) TOUCH SCREEN PANEL, TOUCH SENSING APPARATUS HAVING THE SAME AND DRIVING METHOD THEREOF

(71) Applicant: Samsung Display Co., Ltd., Yongin-Si, Gyeonggi-Do (KR)

(72) Inventors: Won-Ki Hong, Suwon-si (KR); Seung-Ho Nam, Seongnam-si (KR); Ji-Hong Park, Suwon-si (KR); Moon-Sung Choi, Incheon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/349,261

(22) Filed: Nov. 11, 2016

(65) Prior Publication Data

US 2017/0060331 A1    Mar. 2, 2017

Related U.S. Application Data

(63) Continuation of application No. 13/711,907, filed on Dec. 12, 2012, now abandoned.

(30) Foreign Application Priority Data

Jul. 23, 2012    (KR) .................. 10-2012-0079797

(51) Int. Cl.
*G06F 3/041*    (2006.01)
*G06F 3/044*    (2006.01)

(52) U.S. Cl.
CPC ............ *G06F 3/0416* (2013.01); *G06F 3/041* (2013.01); *G06F 3/044* (2013.01); *G06F 3/0412* (2013.01)

(58) Field of Classification Search
CPC ....... G06F 3/0416; G06F 3/0412; G06F 3/044
See application file for complete search history.

(56) References Cited

U.S. PATENT DOCUMENTS

| | | |
|---|---|---|
| 2008/0007539 A1 | 1/2008 | Hotelling |
| 2009/0085885 A1 | 4/2009 | Wu et al. |
| 2009/0267916 A1 | 10/2009 | Hotelling |
| 2009/0267917 A1 | 10/2009 | Lee et al. |
| 2010/0110038 A1 | 5/2010 | Mo et al. |
| 2010/0149108 A1* | 6/2010 | Hotelling ................ G06F 3/044 345/173 |
| 2010/0295819 A1* | 11/2010 | Ozeki .................... G06F 3/044 345/174 |
| 2010/0321326 A1 | 12/2010 | Grunthaner et al. |
| 2011/0048813 A1 | 3/2011 | Yilmaz |

(Continued)

*Primary Examiner* — Wing H Chow
(74) *Attorney, Agent, or Firm* — Cantor Colburn LLP

(57) ABSTRACT

A touch screen panel includes a driving line including a plurality of touch driving units, a sensing line substantially parallel to the driving line and which includes a plurality of touch sensing units, a first driving router disposed adjacent to the driving line and which transmits a first touch pulse to one of an even-numbered touch driving unit and an odd-numbered touch driving unit of the touch driving units, a second driving router disposed adjacent to the driving line and which transmits a second touch pulse to the other of the even-numbered touch driving unit and the odd-numbered touch driving unit of the touch driving units and a plurality of sensing routers connected to each of the touch sensing units and which receives a sensing signal from the touch sensing units.

16 Claims, 14 Drawing Sheets

(56) References Cited

U.S. PATENT DOCUMENTS

| | | |
|---|---|---|
| 2011/0050624 A1 | 3/2011 | Lee et al. |
| 2011/0115718 A1 | 5/2011 | Hsieh et al. |
| 2011/0242028 A1 | 10/2011 | Lee et al. |
| 2012/0169662 A1 | 7/2012 | Chan et al. |
| 2013/0181943 A1* | 7/2013 | Bulea .................. G06F 3/044 345/174 |

* cited by examiner

VARIATION AMOUNT OF CAPACITANCE(%)

|     | SP1    | SP2   | SP3   | SP4  |
|-----|--------|-------|-------|------|
| DP1 | -11.93 | 12.91 | 7.56  | 6.23 |
| DP2 | -1.20  | 25.94 | -0.90 | 7.19 |

VARIATION AMOUNT OF CAPACITANCE(%)

|     | SP1   | SP2   | SP3   | SP4  |
|-----|-------|-------|-------|------|
| DP1 | -8.49 | 61.81 | 14.19 | 8.42 |
| DP2 | -1.71 | 13.24 | 2.21  | 6.27 |

VARIATION AMOUNT OF CAPACITANCE(%)

|     | SP1   | SP2   | SP3  | SP4  |
|-----|-------|-------|------|------|
| DP1 | 13.54 | -1.82 | 5.01 | 4.31 |
| DP2 | 23.68 | -2.03 | 0.88 | 5.69 |

VARIATION AMOUNT OF CAPACITANCE(%)

|     | SP1   | SP2   | SP3   | SP4  |
|-----|-------|-------|-------|------|
| DP1 | 3.33  | 13.55 | 43.69 | 4.85 |
| DP2 | -0.24 | 1.74  | 17.90 | 4.65 |

TOUCH SCREEN PANEL, TOUCH SENSING APPARATUS HAVING THE SAME AND DRIVING METHOD THEREOF

This is a continuation application of U.S. patent application Ser. No. 13/711,907, filed on Dec. 12, 2012, which claims priority to Korean Patent Application No. 10-2012-0079797, filed on Jul. 23, 2012, and all the benefits accruing therefrom under 35 U.S.C. § 119, the content of which in its entirety is herein incorporated by reference.

BACKGROUND (1) Field

Exemplary embodiments of the invention relate to a touch screen panel, a touch sensing apparatus including the touch screen panel and a driving method thereof. More particularly, exemplary embodiments of the invention relate to a touch screen panel with improved touch response speed, a touch sensing apparatus including the touch screen panel and a driving method of the touch sensing apparatus.

(2) Description of the Related Art

Various types of input devices are presently available for performing operations in a computing system, such as buttons or keys, mice, trackballs, touch sensor panels, joysticks, touch screens and the like. Touch screens, in particular, are becoming widely used because of ease and versatility of operation and declining price thereof. Touch screens may include a touch sensor panel, which may be a transparent with a touch-sensitive surface. The touch sensor panel may be positioned in front of a display screen so that the touch-sensitive surface covers the viewable area of the display screen.

Touch screens may allow a user to make selections and move a cursor by simply touching the display screen via a finger or stylus. In general, the touch screen may recognize the touch and position of the touch on the display screen, and the computing system may interpret the touch and thereafter perform an operation based on the touch event.

Touch sensor panels may be implemented as an array of pixels defined by multiple drive lines (e.g., rows) crossing over multiple sense lines (e.g., columns), where the drive and sense lines are separated by a dielectric material. In some touch sensor panels, the row and column lines may be provided on a single side of a substrate. In such touch sensor panels, both near and far electric field lines are coupled between the row and column lines of each pixel, with some of the far-field lines passing through and temporarily exiting the cover glass protecting the drive and sense lines.

When the driving line or the sensing line is configured by plural pads, routers are connected to corresponding pads. For example, a router (e.g., a driving router) connected to a driving pad transmits a touch pulse provided from an external device to a corresponding driving pad, and a router (e.g., a sensing router) connected to a sensing pad transmits a sensing signal sensed through a corresponding sensing pad to the external device.

However, as a resolution of a touch panel is increased, the number of the routers increases such that an interval between router lines decreases, and a parasitic capacitance is thereby increased.

Moreover, as the number of routers is increased, resistive-capacitive ("RC") delay by router lines occurs such that a touch response time increases.

SUMMARY

Exemplary embodiments of the invention provide a touch screen panel with improved touch response by reducing the number of lines therein.

Exemplary embodiments of the invention also provide a touch sensing apparatus having the above-mentioned touch screen panel.

Exemplary embodiments of the invention further also provide a method of driving the above-mentioned touch sensing apparatus.

According to an exemplary embodiment of the invention, a touch screen panel includes a driving line including a plurality of touch driving units, a sensing line substantially parallel to the driving line and which includes a plurality of touch sensing units, a first driving router disposed adjacent to the driving line and which transmits a first touch pulse to one of an even-numbered touch driving unit and an odd-numbered touch driving unit of the touch driving units, a second driving router disposed adjacent to the driving line and which transmits a second touch pulse to the other of the even-numbered touch driving unit and the odd-numbered touch driving unit of the touch driving units and a plurality of sensing routers connected to each of the touch sensing units and which receives a sensing signal from the touch sensing units.

In an exemplary embodiment, the touch driving units and the touch sensing units may be are disposed in a zigzag pattern.

In an exemplary embodiment, the touch driving units adjacent to each other may be disposed to correspond with a center portion of the touch sensing unit.

In an exemplary embodiment, the touch sensing units adjacent to each other may be disposed to correspond with a center portion of the touch driving unit.

In an exemplary embodiment, the touch driving unit may include two driving pads electrically connected to each other. In this case, the driving pads are connected to each other through a driving bridge. In this case, a width of the driving bridge may be substantially narrower than that of the driving pad.

In an exemplary embodiment, the touch sensing unit may include two sensing pads electrically connected to each other. In this case, the sensing pads are connected to each other through a sensing bridge. In this case, a width of the sensing bridge is substantially narrower than that of the sensing pad.

In an exemplary embodiment, a touch driving unit in an upper-most portion may include an outer-most peripheral driving pad, a touch driving unit in a lower-most portion may include an outer-most peripheral driving pad, and each of the remaining touch driving units may include two driving pads electrically connected to each other.

In an exemplary embodiment, each of the touch sensing units may include two sensing pads electrically connected to each other.

In an exemplary embodiment, a touch driving unit of an upper-most portion may include an outer-most peripheral driving pad, a touch driving unit of a lower-most portion may include an outer-most peripheral driving pad, and each of the remaining touch driving units may include a driving pad having a size substantially greater than a size of the outer-most peripheral driving pad of the touch driving unit in the upper-most portion or the lower-most portion.

In an exemplary embodiment, each of the touch sensing units may include a sensing pad having a size substantially greater than the size of the outer-most peripheral driving pad of the touch driving unit in the upper-most portion or the lower-most portion.

In an exemplary embodiment, a touch sensing unit of an upper-most portion may include an outer-most peripheral sensing pad, a touch sensing unit of a lower-most portion may include an outer-most peripheral sensing pad, and each of the remaining touch sensing units may include a sensing pad having a size substantially greater than the size of the outer-most peripheral driving pad of the touch driving unit in the upper-most portion or the lower-most portion.

In an exemplary embodiment, each of the touch driving units may include a driving pad having a size substantially greater than the size of the outer-most peripheral driving pad of the touch driving unit in the upper-most portion or the lower-most portion.

In an exemplary embodiment, the touch screen panel may further include a plurality of touch sensing lines, each of which includes the sensing line and the driving line, and a ground line disposed between the sensing line of an n-th touch sensing line and the driving line of an (n+1)-th touch sensing line, where n is a natural number.

In an exemplary embodiment, the driving line, the sensing line, the first and second driving routers and the sensing routers may include a same material.

In an exemplary embodiment, the driving line, the sensing line, the first and second driving routers and the sensing routers may be disposed in a same layer.

According to another exemplary embodiment of the invention, a touch sensing apparatus includes a touch screen panel, a touch pulse generating part, a sensing signal collecting part and a controller. In such an embodiment, the touch screen panel includes a plurality of touch sensing lines, each of which includes a driving line including a plurality of touch driving units, and a sensing line substantially parallel to the driving line and which includes a plurality of touch sensing units; a first driving router disposed adjacent to the driving line and which transmits a first touch pulse to one of an even-numbered touch driving unit and an odd-numbered touch driving unit of the touch driving units; a second driving router disposed adjacent to the driving line an which transmits a second touch pulse to the other of the even-numbered touch driving unit and the odd-numbered touch driving unit of the touch driving units; and a plurality of sensing routers connected to each of the touch sensing units and which receives a sensing signal from the touch sensing units. In such an embodiment, the touch pulse generating part provides each of the first and second driving routers with the first touch pulse and the second touch pulse, respectively, the sensing signal collecting part is connected to each of the sensing routers and receives a sensing signal provided from the sensing router, and the controller is configured to control an operation of the touch pulse generating part and the sensing signal collecting part to calculate a touch coordinate based on the sensing signal transmitted to the sensing signal collecting part.

In an exemplary embodiment, the touch pulse generating part may simultaneously apply the first touch pulse to the even-numbered touch driving unit of the driving line of each of the touch sensing lines, and where the touch pulse generating part may simultaneously apply the second touch pulse to the odd-numbered touch driving unit of the driving line of each of the touch sensing lines.

In an exemplary embodiment, the sensing signal collecting part may collect the sensing signal from all of the touch sensing units during a period, during which the first touch pulse and the second touch pulse are applied to the even-numbered touch driving unit and the odd-numbered touch driving unit of the driving line of each of the touch sensing lines, respectively.

In an exemplary embodiment, the touch pulse generating part may sequentially apply the first and second touch pulses to the first and second driving routers, respectively.

In an exemplary embodiment, the sensing signal collecting part may collect the sensing signal from the touch sensing units of the sensing line adjacent to the driving line, to which the first and second touch pulses are applied.

In an exemplary embodiment, the touch driving units and the touch sensing units may be disposed in a zigzag pattern.

According to another exemplary embodiment of the invention, a method of driving a touch sensing apparatus includes: applying a first touch pulse and a second touch pulse to an even-numbered touch driving unit and odd-numbered touch driving unit, respectively, where the touch sensing apparatus includes a plurality of driving lines, each of which includes the even-numbered touch driving unit and the odd-numbered touch driving unit; collecting a plurality of sensing signals from a plurality of touch sensing units of a sensing line of the touch sensing apparatus during a period, during which the first and second touch pulses are applied to the even-numbered touch driving unit and the odd-numbered touch driving unit of each of the driving lines, respectively; and calculating a touch coordinate based on the collected sensing signals.

In an exemplary embodiment, the first touch pulse may be simultaneously applied to the even-numbered touch driving unit of each of the driving lines, and the second touch pulse may be simultaneously applied to the odd-numbered touch driving unit of each of the driving lines.

In an exemplary embodiment, the sensing signals may be collected from all of the touch sensing units during a period, during which the first touch pulse and the second touch pulse are applied to the even-numbered touch driving unit and the odd-numbered touch driving unit of each of the driving lines, respectively.

According to one or more exemplary embodiment of a touch screen panel, a touch sensing apparatus including the touch screen panel and a driving method thereof, touch driving units of a driving line is divided into even-numbered touch driving units and odd-numbered touch driving units, and the touch sensing units of the driving line and the touch driving units of a sensing line adjacent to the driving line are disposed in a zigzag pattern. Accordingly, the number of the sensing routers connected to sensing lines adjacent to the driving lines is substantially decreased.

In one or more exemplary embodiment, the resistive-capacitive ("RC") delay is reduced such that a charging time is decreased, thereby substantially improving touch response. When the number of sensing routers is decreased, a parasitic capacitance and noise may be reduced, thereby enhancing touch accuracy.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

Figure 1:
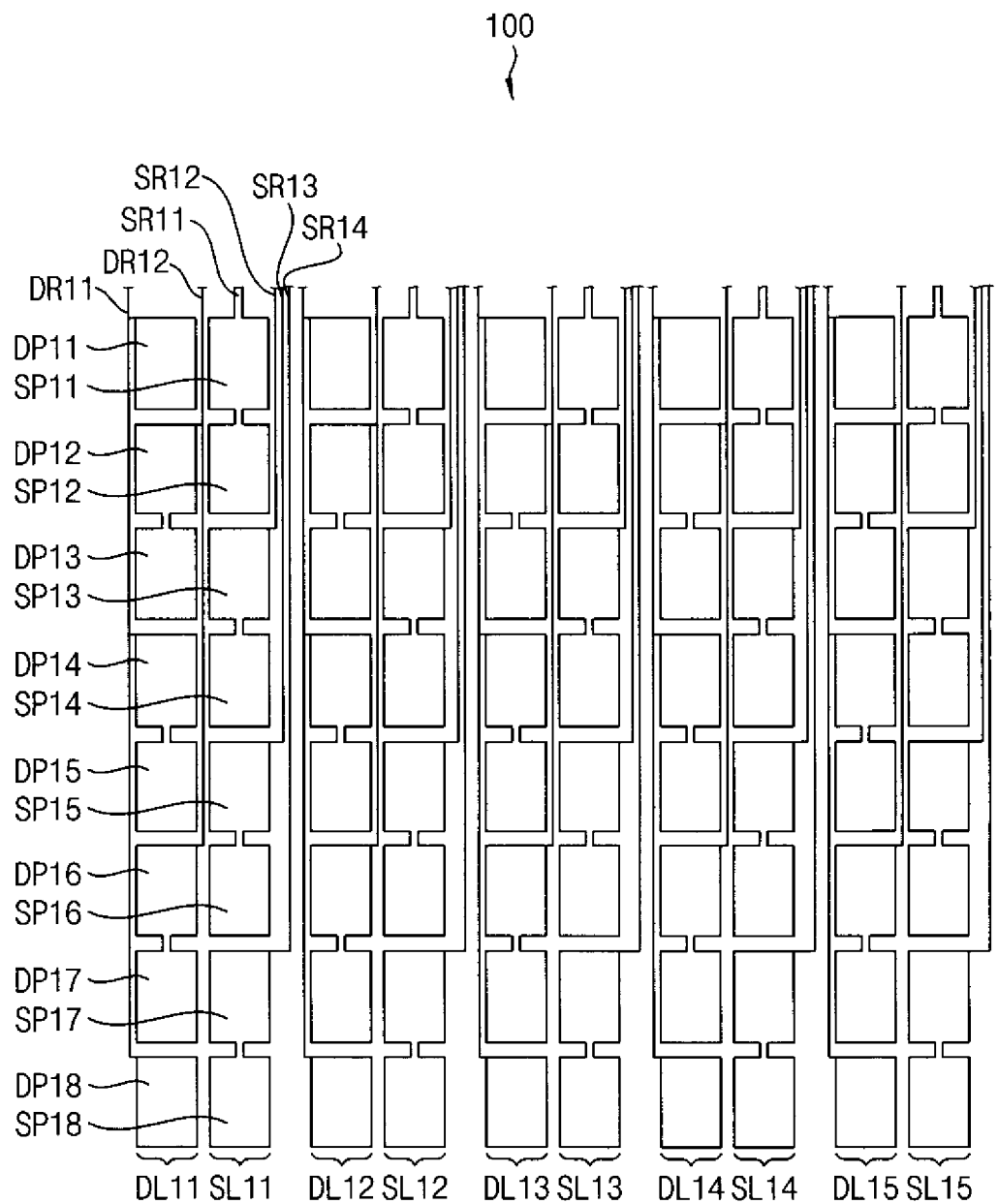
FIG. 1 is a plan view schematically showing an exemplary embodiment of a touch screen panel according to an exemplary embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a touch screen panel, a touch sensing apparatus having the touch screen panel and a driving method thereof will be described in detail with reference to the accompanying drawings.

Hereinafter, "touch sensing apparatus" refers to an electronic device that employs a touch screen panel as an input means. The touch sensing apparatus may be adapted to a cellular phone of a touch type, a smart phone, a personal digital assistant ("PDA"), a personal multimedia player ("PMP"), a car navigation, a kiosk, a home electronic instrument like TV, refrigerator and a computer like tablet PC, for example.

FIG. 1 is a plan view schematically showing an exemplary embodiment of a touch screen panel 100 according to the invention.

Referring to FIG. 1, a touch screen panel 100 includes a plurality of driving lines DL11, DL12, DL13, DL14 and DL15, a plurality of sensing lines SL11, SL12, SL13, SL14 and SL15, a plurality of first driving routers DR11, a plurality of second driving routers DR12 and a plurality of sensing routers SR11, SR12, SR13 and SR14. In such an embodiment, one driving line and one sensing lines, which are corresponding to each other, may define a touch sensing line.

The driving lines DL11, DL12, DL13, DL14 and DL15, the sensing lines SL11, SL12, SL13, SL14 and SL15, the first driving routers DR11, the second driving routers DR12 and the sensing routers SR11, SR12, SR13 and SR14 may be provided, e.g., manufactured, using a single mask.

In an exemplary embodiment, the driving lines DL11, DL12, DL13, DL14 and DL15, the sensing lines SL11, SL12, SL13, SL14 and SL15, the first driving routers DR11, the second driving routers DR12 and the sensing routers SR11, SR12, SR13 and SR14 may include a same material. In one exemplary embodiment, for example, the driving lines DL11, DL12, DL13, DL14 and DL15, the sensing lines SL11, SL12, SL13, SL14 and SL15, the first driving routers DR11, the second driving routers DR12 and the sensing routers SR11, SR12, SR13 and SR14 may include an optically transparent and electrically conductive material such as indium tin oxide ("ITO") and indium zinc oxide ("IZO"), for example.

In such an embodiment, the driving lines DL11, DL12, DL13, DL14 and DL15, the sensing lines SL11, SL12, SL13, SL14 and SL15, the first driving routers DR11, the second driving routers DR12 and the sensing routers SR11, SR12, SR13 and SR14 may be disposed on a same plan surface, e.g., on a same surface of a substrate.

In an exemplary embodiment, as shown in FIG. 1, the number of driving lines may be five, and the number of sensing lines may be five. In such an embodiment, one driving line is connected to two driving routers, and one sensing line is connected to four sensing routers. In this case, an example is illustrated that, the number of driving lines is five and the number of sensing lines is five, but the present invention will not be limited to this.

Hereinafter, each of the driving lines sequentially disposed from a left portion to right portion of the touch screen 100 will be referred to as a first driving line DL11, a second driving line DL12, a third driving line DL13, a fourth driving line DL4 and a fifth driving line DL15. Each of the sensing lines sequentially disposed from a left portion to right portion of the touch screen 100 will be referred to as a first sensing line SL11, a second sensing line SL12, a third sensing line SL13, a fourth sensing line SL14 and a fifth sensing line SL15. In an exemplary embodiment, the first to fifth sensing lines SL11, SL12, SL13, SL4 and SL15 are disposed adjacent to the first to fifth driving lines DL1, DL12, DL13, DL14 and DL15, respectively.

Each of the first to fifth driving lines DL11, DL12, DL13, DL14 and DL15 includes a plurality of touch driving units disposed in a touch area. In an exemplary embodiment, as shown in FIG. 1, one driving line is defined by five touch driving units. A touch driving unit of an upper-most portion includes an outer-most peripheral driving pad, and a touch driving unit of a lower-most portion includes an outer-most peripheral driving pad. In one exemplary embodiment, for example, the touch driving unit of the upper-most portion may include a single outer-most peripheral driving pad, and the touch driving unit of the lower-most portion may include a single outer-most peripheral driving pad. Each of the remaining touch driving units includes two driving pads electrically connected to each other.

One driving line includes eight driving pads DP11, DP12, DP13, DP14, DP15, DP16, DP17 and DP18. Each size of the driving pads DP11, DP12, DP13, DP14, DP15, DP16, DP17 and DP18 may be equal to each other. A touch driving unit of an upper-most portion, e.g., a first driving pad DP11 that defines a first touch driving unit TDU1, is independently disposed thereon. A second driving pad DP12 and a third driving pad DP13, which define a second touch driving unit TDU2, are electrically connected to each other through a first driving bridge BRD1, and a fourth driving pad DP14 and a fifth driving pad DP15, which define a third touch driving unit TDU3, are electrically connected to each other through a second driving bridge BRD2. In an exemplary embodiment, a width of the first driving bridge BRD1 is substantially narrower than a width of the second driving pad DP12 or the third driving pad DP13, and a width of the second driving bridge BRD1 is substantially narrower than a width of the fourth driving pad DP14 or the fifth driving pad DP15. A sixth driving pad DP16 and a seventh driving pad DP17, which defines a fourth touch driving unit TDU4, are electrically connected to each other through a third driving bridge BRD3. In an exemplary embodiment, a width of the third driving bridge BRD3 is substantially narrower than a width of the sixth driving pad DP16 or the seventh driving pad DP17. A touch driving unit of a lower-most portion, that is, an eighth driving pad DP18 that defines a fifth touch driving unit TDU5 is independently disposed thereon.

Each of the first to fifth sensing lines SL11, SL12, SL13, SL14 and SL15 includes a plurality of touch sensing units TSU1, TSU2, TSU3 and TSU4 disposed in a direction substantially parallel to the driving lines. The touch sensing units TSU1, TSU2, TSU3 and TSU4 and the touch driving units TDU1, TDU2, TDU3, TDU4 and TSU5 are disposed in a zigzag pattern. That is, the touch driving units adjacent to each other may be disposed to correspond with a center portion of the touch sensing unit. Alternatively, the touch sensing units adjacent to each other may be disposed to correspond with a center portion of the touch driving unit. Each of the touch sensing units TSU1, TSU2, TSU3 and TSU4 includes two sensing pads electrically connected to each other.

In an exemplary embodiment, one sensing line is defined by four touch sensing units TSU1, TSU2, TSU3 and TSU4. In such an embodiment, one sensing line is defined by eight sensing pads SP11, SP12, SP13, SP14, SP15, SP16, SP17 and SP18. Each size of the sensing pads SP11, SP12, SP13, SP14, SP15, SP16, SP17 and SP18 may be equal to each other. A first sensing pad SP11 and a second sensing pad SP12 are electrically connected through a first sensing bridge BRS1, and a third sensing pad SP13 and a fourth sensing pad SP14 are electrically connected to each other through a second sensing bridge BRS2. In an exemplary embodiment, a width of the first sensing bridge BRS1 is substantially narrower than a width of the first sensing pad SP11 or the second sensing pad SP12, and a width of the second sensing bridge BRS2 is substantially narrower than a width of the third sensing pad SP13 or the fourth sensing pad SP14. A fifth sensing pad SP15 and a sixth sensing pad SP16 are electrically connected to each other through a third sensing bridge BRS3, and a seventh sensing pad SP17 and an eighth sensing pad SP18 are electrically connected to each other through a fourth sensing bridge BRS4. In an exemplary embodiment, a width of the third sensing bridge BRS3 is substantially narrower than a width of the fifth sensing pad SP15 or the sixth sensing pad SP16, and a width of the fourth sensing bridge BRS4 is substantially narrower than a width of the seventh sensing pad SP17 or the eighth sensing pad SP18.

The first driving router DR11 transmits a first touch pulse to even-numbered touch driving units, and the second driving router DR12 transmits a second touch pulse to odd-numbered touch driving units. In FIG. 1, the even-numbered touch driving units may include the first touch driving unit TDU1, the third touch driving unit TDU3 and the fifth touch driving unit TDU5, and the odd-numbered touch driving units may include the second touch driving unit TDU2 and the fourth touch driving unit TDU4.

In one exemplary embodiment, for example, the first driving router DR11 is connected to the first driving pad DP11, the fourth driving pad DP14 and the eighth driving pad DP18, and the second driving router DR12 is connected to the second driving pad DP12 and the sixth driving pad DP16.

In such an embodiment, the second driving pad DP12 is connected to the third driving pad DP13, and the third driving pad DP13 receives the same touch pulse as the second driving pad DP12 from the second driving router DR12. In such an embodiment, the fourth driving pad DP14 is connected to the fifth driving pad DP15, and the fifth driving pad DP15 receives the same touch pulse as the fourth driving pad DP14 from the first driving router DR11. In such an embodiment the sixth driving pad DP16 is connected to the seventh driving pad DP17, and the seventh driving pad DP17 receives the same touch pulse as the sixth driving pad DP16 from the second driving router DR12.

The sensing routers receive sensing signals from the sensing pads electrically connected to each other in the same sensing lines. For convenience of description, only a first sensing router SR11, a second sensing router SR12, a third sensing router SR13 and a fourth sensing router SR14 that are disposed to receive a sensing signal from the sensing pads of the first sensing line SL11 will hereinafter be described in detail.

In an exemplary embodiment, the first sensing router SR11 is connected to the first sensing pad SP11, and the second sensing router SR12 is connected to the third sensing pad SP13. In such an embodiment, the third sensing router SR13 is connected to the fifth sensing pad SP15, and the fourth sensing router SR14 is connected to the seventh sensing pad SP17.

The first sensing pad SP11 is connected to the second sensing pad SP12 through the first sensing bridge BRS1, such that the first sensing router SR11 may receive a sensing signal from the first sensing pad SP11 and the second sensing pad SP12. In such an embodiment, the third sensing pad SP13 is connected to the fourth sensing pad SP14 through the second sensing bridge BRS2, such that the second sensing router SR12 may receive a sensing signal from the third sensing pad SP13 and the fourth sensing pad SP14. In such an embodiment, the fifth sensing pad SP15 is connected to the sixth sensing pad SP16 through the third sensing bridge BRS3, such that the third sensing router SR13 may receive a sensing signal from the fifth sensing pad SP15 and the sixth sensing pad SP16. In such an embodiment, the seventh sensing pad SP17 is connected to the eighth sensing pad SP18 through the fourth sensing bridge BRS4, such that the fourth sensing router SR14 may receive a sensing signal from the seventh sensing pad SP17 and the eighth sensing pad SP18.

According to an exemplary embodiment, two driving pads adjacent to each other in one driving line are electrically connected to each other. In such an embodiment, two ends (e.g., an upper-most portion and lower-most portion) of the driving pads are independently provided. In such an embodiment, two sensing pads adjacent to each other in one sensing line are electrically connected to each other. Thus, driving pads electrically connected to each other and sensing pads electrically connected to each other are disposed in a zigzag pattern.

In an exemplary embodiment, the driving lines in each row are driven independently in a scan manner. In such an embodiment, the driving lines may be driven in a time-division manner.

In such an embodiment, the number of the driving routers is ten (i.e., 2×5), and the number of the sensing routers is twenty (i.e., 4×5). That is, the total number of the routers is thirty. In this case, an example is illustrated that the number of the driving routers is ten and the number of the sensing routers is twenty, but the present invention will not be limited to this.

Figure 2:
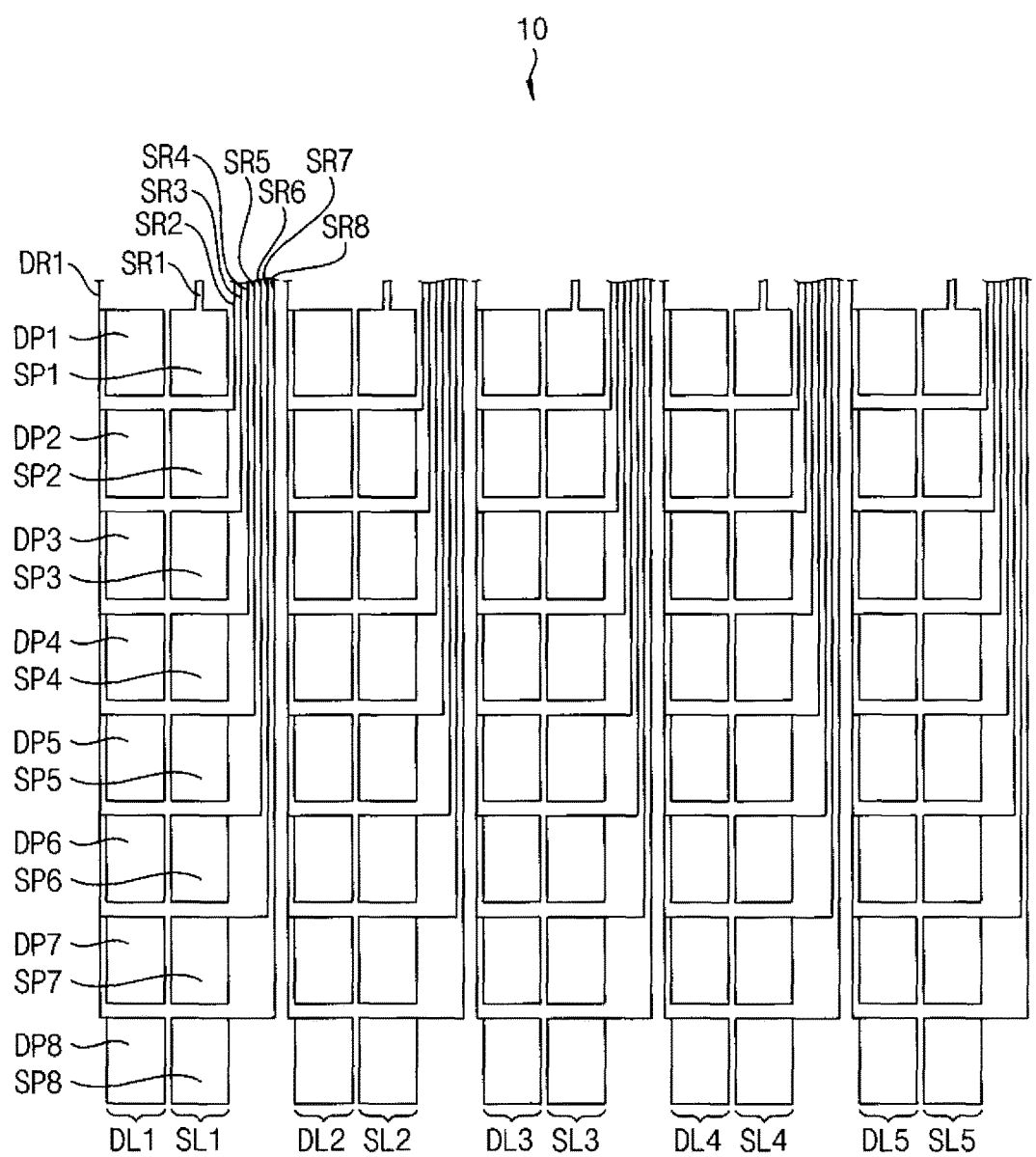
FIG. 2 is a plan view schematically showing a comparative embodiment of a touch screen panel.

FIG. 2 is a plan view schematically showing a comparative embodiment of a touch screen panel 10 according to the invention.

Referring to FIG. 2, a comparative embodiment of a touch screen panel 10 includes a plurality of driving lines, a plurality of sensing lines, a plurality of driving routers and a plurality of sensing routers. In the comparative embodiment, the number of driving lines is five, and the number of sensing lines is five. In the comparative embodiment, one driving lines is connected to one driving router, and one sensing line is connected to eight sensing routers.

Hereinafter, each of the driving lines sequentially disposed from a left portion to right portion of the touch screen panel 10 will be referred to as a first driving line DL1, a second driving line DL2, a third driving line DL3, a fourth driving line DL4 and a fifth driving line DL5. Each of the sensing lines sequentially disposed from a left portion to right portion of the touch screen panel 10 will be referred to as a first sensing line SL1, a second sensing line SL2, a third sensing line SL3, a fourth sensing line SL4 and a fifth sensing line SL5. In the comparative embodiment, the first to fifth sensing lines SL1, SL2, SL3, SL4 and SL5 are disposed adjacent to the first to fifth driving lines DL1, DL2, DL3, DL4 and DL5, respectively.

Each of the first to fifth driving lines DL1, DL2, DL3, DL4 and DL5 includes a plurality of driving pads disposed in a touch area. In the comparative embodiment, each of the driving pads is independently disposed, e.g., not connected to each other, in the same driving line.

Each of the first to fifth sensing lines SL1, SL2, SL3, SL4 and SL5 includes a plurality of sensing pads disposed in a direction substantially parallel to the driving lines. In the comparative embodiment, each of the sensing pads is independently disposed, e.g., not connected to each other, in the same sensing line.

The driving router DR1 provides the driving pads with touch pulses in the same driving lines. In the comparative embodiment, the driving router DR1 is connected to a first driving pad DP1, a second driving pad DP2, a third driving pad DP3, a fourth driving pad DP4, a fifth driving pad DP5, a sixth driving pad DP6, a seventh driving pad DP7 and an eighth driving pad DP8.

The sensing routers receive sensing signals from the sensing pads independently disposed, e.g., not connected to each other, in the same sensing line.

In the comparative embodiment, the first sensing router SR1 is connected to the first sensing pad SP1 to receive a sensing signal, and the second sensing router ST2 is connected to the second sensing pad SP2 to receive a sensing signal. The third sensing router SR3 is connected to the third sensing pad SP3 to receive a sensing signal, and the fourth sensing router ST4 is connected to the fourth sensing pad SP4 to receive a sensing signal. The fifth sensing router SR5 is connected to the fifth sensing pad SP5 to receive a sensing signal, and the sixth sensing router ST6 is connected to the sixth sensing pad SP6 to receive a sensing signal. The seventh sensing router SR7 is connected to the seventh sensing pad SP7 to receive a sensing signal, and the eighth sensing router ST8 is connected to the eighth sensing pad SP8 to receive a sensing signal.

According to the comparative embodiment, the number of the driving routers is five (i.e., 1×5), and the number of the sensing routers is forty (i.e., 8×5). That is, the total number of the routers is forty-five in the comparative embodiment.

Accordingly, the total number of the routers in the comparative embodiment is greater than the total number of the routers in an exemplary embodiment of the invention.

In a touch screen panel 10, when the number of the routers increases, a line resistance is increased. When the line resistance is increased, a charging time according to resistive-capacitive ("RC") delay is increased. When the charging time is increased, a touch response time is increased.

In a case that a resolution of a touch screen panel is m×n (where, 'm' is the number of driving pads (or sensing pads) arranged in a Y-axis direction, and 'n' is the number of driving lines (or sensing lines) arranged in a X-axis direction), with the number of routers and the total length of the routers in the exemplary embodiment of FIG. 1 and the comparative embodiment of FIG. 2 are shown in the following Table 1.

TABLE 1

|  | Comparative Embodiment | Exemplary Embodiment | Ratio |
| --- | --- | --- | --- |
| The number of routers | $(m + 1)n$ | $\left(\frac{m}{2} + 2\right)n$ | $\frac{(m + 4)}{(2m + 2)}$ |
| Total length of routers | $\left(\frac{m^2 + m - 2}{2}\right)n$ | $\left(\frac{m^2 + 6m - 16}{4}\right)n$ | $\frac{(m^2 + 6m - 16)}{2(m^2 + m - 2)}$ |

When 'm' is substantially large, as shown in Table 1, the number and length of routers disposed in a touch screen panel in an exemplary embodiment of the invention are about 50% of the number and length of routers disposed in the comparative embodiment of a touch screen panel.

In a case that a touch screen panel has a horizontal length of about 137.5 millimeters (mm) and a vertical length of about 220 mm, a resolution of the touch screen panel is about 54×34, and a size of a touch sensing unit configured by a unit driving pan and a unit sensing pad is 4.04 mm×4.0 mm, with the number of routers and the total length of router in an exemplary embodiment of FIG. 1 and Comparative Embodiment of FIG. 2 are shown in the following Table 2.

TABLE 2

|  | Comparative Embodiment | Exemplary Embodiment | Ratio |
| --- | --- | --- | --- |
| The number of routers | 1,870 | 986 | 52.7 |
| Total length of routers | 50,456 mm | 27,404 mm | 54.3 |

Referring to Table 2, the number of routers in a touch screen panel in the comparative embodiment is 1,870, and the number of routers in a touch screen panel in an exemplary embodiment is 986. Thus, the number of routers of a touch screen panel in the exemplary embodiment is about 52.7% of the number of routers of a touch screen panel in the comparative embodiment.

As shown in Table 2, the total length of routers in a touch screen panel in the comparative embodiment is about 50,456 mm; however, the total length of routers in a touch screen panel in an exemplary embodiment is about 27,404 mm. Thus, the total length of routers of a touch screen panel in an exemplary embodiment is about 54.3% of the total length of routers of a touch screen panel in the comparative embodiment.

As described above, in an exemplary embodiment of a touch screen panel according to the invention, where the number of routers is decreased about 50% such that a line width may be increased not less than twice. Thus, a resistance of a router is decreased, and a RC delay is thereby decreased.

When the number of routers is decreased, a parasitic capacitance is decreased. Therefore, a noise is decreased, thereby substantially enhancing touch accuracy.

In an exemplary embodiment, when line widths of routers are substantially equal to each other, a distance between pads is decreased such that a touch may be sensed substantially precisely. In such an embodiment, when a touch is performed by a tip having a small size (for example, a tip of a stylus pen), an area, on which a touch is not sensed, is decreased.

In such an embodiment, a touch screen panel may be realized without decreasing the number of routers, and the number of pads may be increased two times such that a touch resolution is increased two times.

Figure 3:
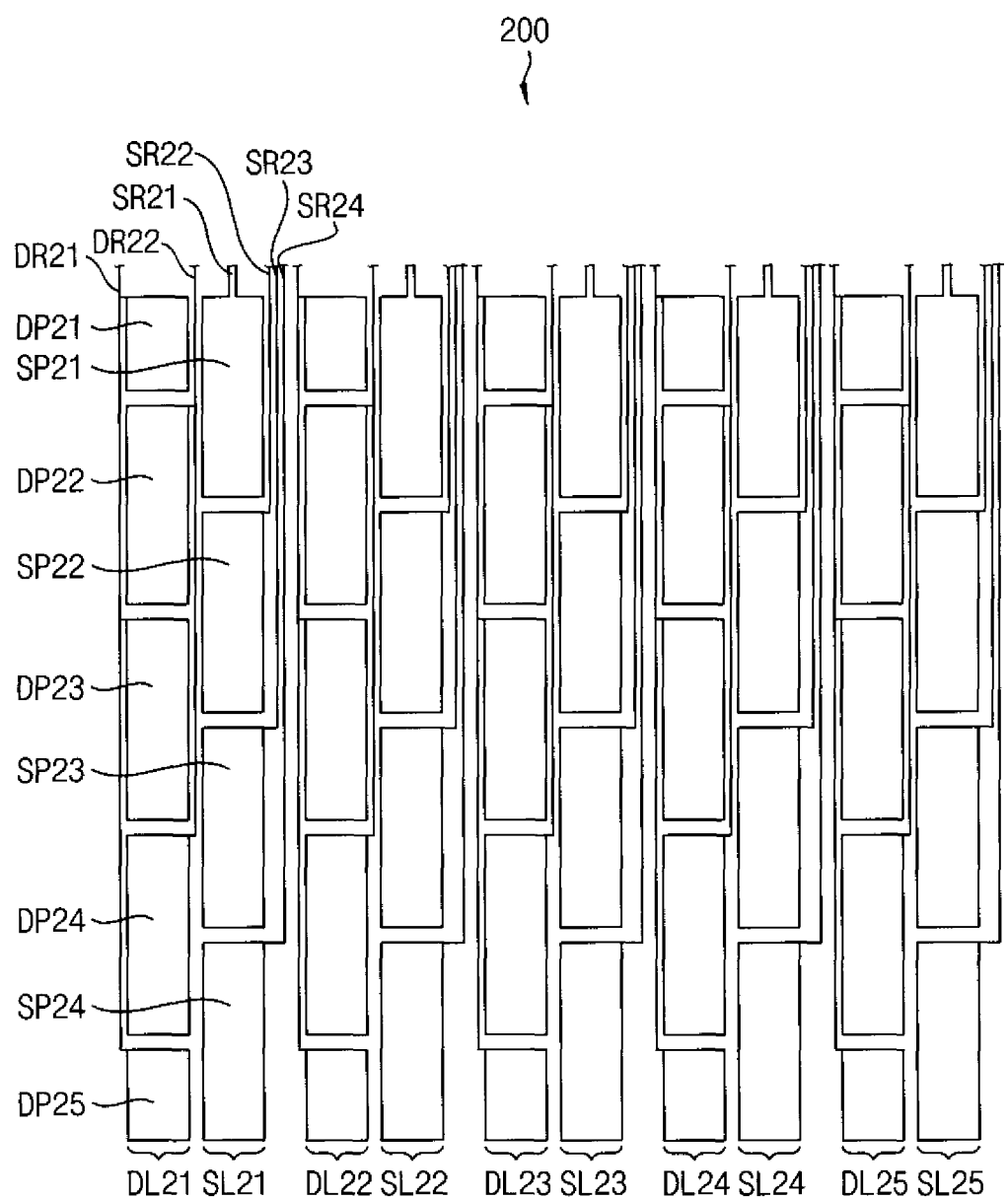
FIG. 3 is a plan view schematically showing an alternative exemplary embodiment of a touch screen panel according to the invention.

FIG. 3 is a plan view schematically showing an alternative exemplary embodiment of a touch screen panel according to the invention.

Referring to FIG. 3, an alternative exemplary embodiment of a touch screen panel 200 according to the invention includes a plurality of driving lines DL21, DL22, DL23, DL24 and DL25, a plurality of sensing lines SL21, SL22, SL23, SL24 and SL25, a plurality of first driving routers DR21, a plurality of second driving routers DR22 and a plurality of sensing routers SR21, SR22, SR23 and SR24.

In an exemplary embodiment, the driving lines DL21, DL22, DL23, DL24 and DL25, the sensing lines SL21, SL22, SL23, SL24 and SL25, the first driving routers DR21, the second driving routers DR22 and the sensing routers SR21, SR22, SR23 and SR24 may be provided, e.g., manufactured, using a same mask. In such an embodiment, the driving lines DL21, DL22, DL23, DL24 and DL25, the sensing lines SL21, SL22, SL23, SL24 and SL25, the first driving routers DR21, the second driving routers DR22 and the sensing routers SR21, SR22, SR23 and SR24 may include a same material. In one exemplary embodiment, for example, the driving lines DL21, DL22, DL23, DL24 and DL25, the sensing lines SL21, SL22, SL23, SL24 and SL25, the first driving routers DR21, the second driving routers DR22 and the sensing routers SR21, SR22, SR23 and SR24 may include an optically transparent and electrically conductive material such as ITO and IZO, for example.

In an exemplary embodiment the driving lines DL21, DL22, D213, D214 and DL25, the sensing lines SL21, SL22, SL23, SL24 and SL25, the first driving routers DR21, the second driving routers DR22 and the sensing routers SR21, SR22, SR23 and SR24 may be disposed on a same plan surface, e.g., a same surface of a substrate.

In an exemplary embodiment, as shown in FIG. 3, the number of driving lines may be five, and the number of sensing lines may be five. In such an embodiment, one driving lines is connected to two driving routers, and one sensing line is four sensing routers. In this case, an example is illustrated that, the number of driving lines is five and the number of sensing lines is five, but the present invention will not be limited to this.

Hereinafter, each of the driving lines sequentially disposed from a left portion to right portion of the touch screen panel 200 will be referred to as a first driving line DL21, a second driving line DL22, a third driving line DL23, a fourth driving line DL4 and a fifth driving line DL25. Each of the sensing lines sequentially disposed from a left portion to right portion of the touch screen panel 200 will be referred to as a first sensing line SL21, a second sensing line SL22, a third sensing line SL23, a fourth sensing line SL24 and a fifth sensing line SL25. In such an embodiment, the first to fifth sensing lines SL21, SL22, SL23, SL4 and SL25 are disposed adjacent to the first to fifth driving lines DL2, DL22, DL23, DL24 and DL25, respectively.

Each of the first to fifth driving lines DL21, DL22, DL23, DL24 and DL25 includes a plurality of touch driving units disposed in a touch area. In an exemplary embodiment, one driving line is defined by five touch driving units. In this case, an example is illustrated that five touch driving units define one driving line, but the present invention will not be limited to this.

A touch driving unit of an upper-most portion includes one outer-most peripheral driving pad, and a touch driving unit of a lower-most portion includes one outer-most peripheral driving pad. Each of the remaining touch driving units includes a driving pad having a size substantially greater than a size of the driving pad of the outer-most peripheral.

In an exemplary embodiment, one touch driving unit corresponds to one driving pad. One driving line is defined by a first driving pad DP21, a second driving pad DP22, a third driving pad DP23, a fourth driving pad DP24 and a fifth driving pad DP25. In such an embodiment, each size of the first and fifth driving pads DP21 and DP25 is about half of the size of the second driving pad DP22. In an exemplary embodiment, horizontal lengths of the first and fifth driving pads DP21 and DP25 are substantially equal to a horizontal length of the second driving pad DP22, and vertical lengths of the first and fifth driving pads DP21 and DP25 are about half of a vertical length of the second driving pad DP22. Sizes of the second to fourth driving pads DP22, DP23 and DP24 are substantially to the same as each other.

Each of the first to fourth sensing lines SL21, SL22, SL23 and SL24 includes a plurality of touch sensing units disposed in a direction substantially parallel to the driving lines. The touch sensing units and the touch driving units are disposed in a zigzag pattern. In an exemplary embodiment, one sensing line is defined by four touch sensing units. In such an embodiment, one sensing line is defined by a first sensing pad SP21, a second sensing pad SP22, a third sensing pad SP23 and a fourth sensing pad SP24.

The first driving router DR21 is connected to the first driving pad DP21, the third driving pad DP23 and the fifth driving pad DP25, and the second driving router DR22 is connected to the second driving pad DP22 and the fourth driving pad DP24.

The sensing routers receive sensing signals from the sensing pads independently disposed, e.g., not connected to each other, in the same sensing lines. For convenience of description, only a first sensing router SR21, a second sensing router SR22, a third sensing router SR23 and a fourth sensing router SR24 that are disposed to receive a sensing signal from the sensing pads of the first sensing line SL21 will hereinafter be described.

In an exemplary embodiment, as shown in FIG. 3, the first sensing router SR21 is connected to the first sensing pad SP21, and the second sensing router SR22 is connected to the second sensing pad SP22. In such an embodiment, the third router SR23 is connected to the third sensing pad SP23, and the fourth sensing router SR24 is connected to the fourth sensing pad SP24.

Figure 4:
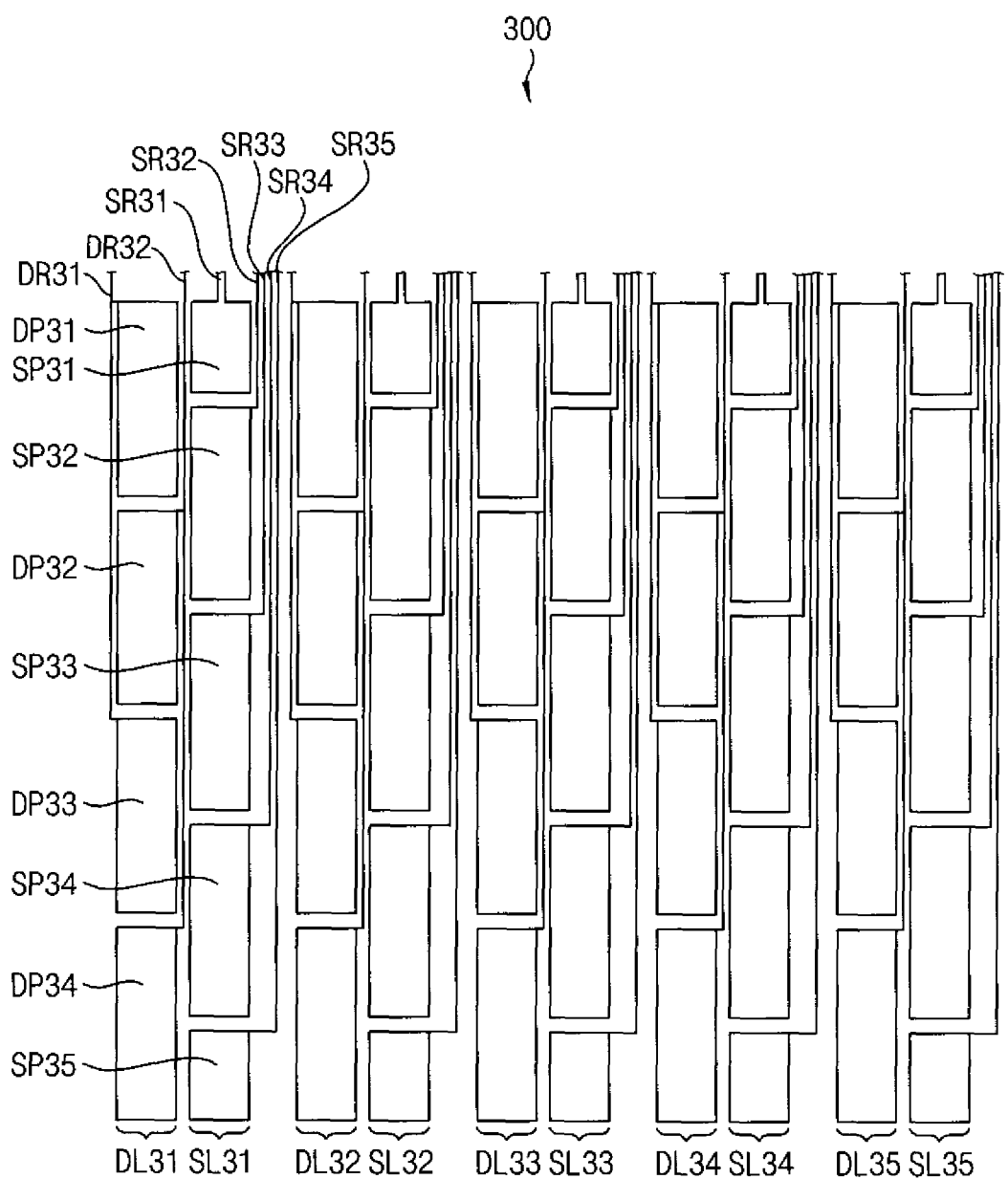
FIG. 4 is a plan view schematically showing another alternative exemplary embodiment of a touch screen panel according to the invention.

FIG. 4 is a plan view schematically showing another alternative exemplary embodiment of a touch screen panel according to the invention.

Referring to FIG. 4, another alternative exemplary embodiment of a touch screen panel 300 according to the invention includes a plurality of driving lines DL31, DL32, DL33, DL34 and DL35, a plurality of sensing lines SL31, SL32, SL33, SL34 and SL35, a plurality of first driving routers DR31, a plurality of second driving routers DR32 and a plurality of sensing routers SR31, SR32, SR33 and SR34.

The driving lines DL31, DL32, DL33, DL34 and DL35, the sensing lines SL31, SL32, SL33, SL34 and SL35, the first driving routers DR31, the second driving routers DR32 and the sensing routers SR31, SR32, SR33 and SR34 may be provided, e.g., manufactured, using a single mask.

Thus, the driving lines DL31, DL32, DL33, DL34 and DL35, the sensing lines SL31, SL32, SL33, SL34 and SL35, the first driving routers DR31, the second driving routers DR32 and the sensing routers SR31, SR32, SR33 and SR34 may include the same material. For example, the driving lines DL31, DL32, DL33, DL34 and DL35, the sensing lines SL31, SL32, SL33, SL34 and SL35, the first driving routers DR31, the second driving routers DR32 and the sensing routers SR31, SR32, SR33 and SR34 may include an optically transparent and electrically conductive material such as ITO and IZO, for example.

In such an embodiment, the driving lines DL31, DL32, DL33, DL34 and DL35, the sensing lines SL31, SL32, SL33, SL34 and SL35, the first driving routers DR31, the second driving routers DR32 and the sensing routers SR31, SR32, SR33 and SR34 may be provided on a same surface, e.g., on a same surface of a substrate.

In an exemplary embodiment, as shown in FIG. 4, the number of driving lines may be five, and the number of sensing lines may be five. In such an embodiment, one driving lines is connected to two driving routers, and one sensing line is four sensing routers. In this case, an example is illustrated that, the number of driving lines is five and the number of sensing lines is five, but the present invention will not be limited to this.

Hereinafter, each of the driving lines sequentially disposed from a left portion to right portion of the touch screen 300 will be referred to as a first driving line DL31, a second driving line DL32, a third driving line DL33, a fourth driving line DL4 and a fifth driving line DL35. Each of the sensing lines sequentially disposed from a left portion to right portion of the touch screen 300 will be referred to as a first sensing line SL31, a second sensing line SL32, a third sensing line SL33, a fourth sensing line SL34 and a fifth sensing line SL35. In such an embodiment, the first to fifth sensing lines SL31, SL32, SL33, SL4 and SL35 are disposed adjacent to the first to fifth driving lines DL3, DL32, DL33, DL34 and DL35, respectively.

Each of the first to fifth driving lines DL31, DL32, DL33, DL34 and DL35 includes a plurality of touch driving units disposed in a touch area. The driving lines are in one-to-one correspondence with the driving pads. In an exemplary embodiment, a driving line includes a first driving pad DP31, a second driving pad DP32, a third driving pad DP33 and a fourth driving pad DP34. The first driving pad DP31, the second driving pad DP32, the third driving pad DP33 and the fourth driving pad DP34 are independently disposed in the one driving line.

Each of the first to fifth sensing lines SL31, SL32, SL33, SL34 and SL35 includes a plurality of touch sensing units to be disposed in a direction substantially parallel to the driving lines. The touch sensing units and the touch driving units are disposed in zigzag pattern. The touch sensing units are in one-to-one correspondence with the touch pads. A touch sensing unit of an upper-most portion includes an outer-most peripheral sensing pad, and a touch sensing unit of a lower-most portion includes an outer-most peripheral sensing pad. Each of the remaining touch sensing units includes a sensing pad having a size greater than a size of the outer-most peripheral sensing pad.

In an exemplary embodiment, one sensing line includes a first sensing pad SP31, a second sensing pad SP32, a third sensing pad SP33, a fourth sensing pad SP34 and a fifth sensing pad SP35. The first sensing pad SP31, the second sensing pad SP32, the third sensing pad SP33, the fourth sensing pad SP34 and the fifth sensing pad SP35 are independently disposed in the one sensing line. In such an embodiment, a size of each of the first and fifth sensing pads SP31 and SP35 is half of a size of the second sensing pad SP32. In an exemplary embodiment, horizontal lengths of the first and fifth sensing pads SP31 and SP35 are substantially equal to a horizontal length of the second sensing pad SP32, and vertical lengths of the first and fifth sensing pads SP31 and SP35 are substantially half of a vertical length of the second sensing pad SP32. Sizes of the second to fourth sensing pads SP32, SP33 and SP34 are substantially equal to each other.

The first and second driving routers DR31 and DR32 provide first and second touch pulses to each of the driving pads independently disposed in the same driving lines. For convenience of description, only a first driving router DR31 and a second driving router DR32 that are disposed to provide driving pads of the first driving line DL31 with a sensing signal will hereinafter be described.

The first driving router DR31 is connected to the first driving pad DP31 and the third driving pad DP33, and the second driving router DR32 is connected to the second driving pad DP32 and the fourth driving pad DP34.

The sensing routers receive sensing signals from the sensing pads independently disposed in the same sensing lines. For convenience of description, only a first sensing router SR31, a second sensing router SR32, a third sensing router SR33, a fourth sensing router SR34 and a fifth sensing router SR35 that are disposed to receive a sensing signal from the sensing pads of the first sensing line SL31 will hereinafter be described.

The first sensing router SR31 is connected to the first sensing pad SP31, and the second sensing router SR32 is connected to the second sensing pad SP32. The third router SR33 is connected to the third sensing pad SP33, the fourth sensing router SR34 is connected to the fourth sensing pad SP34, and fifth sensing router SR35 is connected to the fifth sensing pad SP35.

In an exemplary embodiment, a size of a first sensing pad SP31, which is the first sensing pad disposed at each sensing lines, and a fifth sensing pad SP35, which is the last sensing pad, are about a half of a size of other sensing pads.

Figure 5:
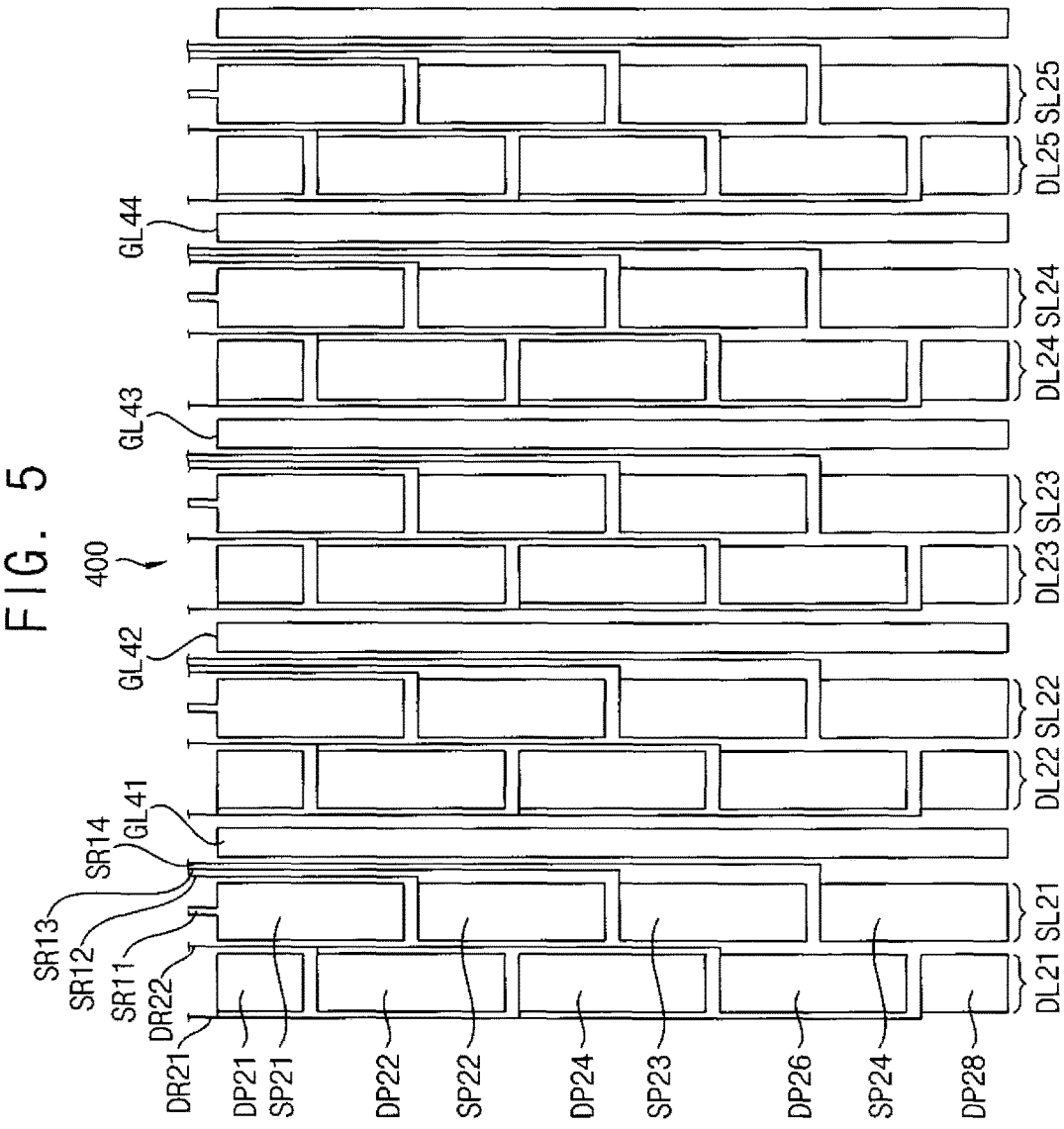
FIG. 5 is a plan view schematically showing another alternative exemplary embodiment of a touch screen panel according to the invention.

FIG. 5 is a plan view schematically showing another alternative exemplary embodiment of a touch screen panel according to the invention.

Referring to FIG. 4, a touch screen panel 400 according to a fourth exemplary embodiment of the invention includes a plurality of driving lines DL21, DL22, DL23, DL24 and DL25, a plurality of sensing lines SL21, SL22, SL23, SL24 and SL25, a plurality of first driving routers DR21, a plurality of second driving routers DR22, a plurality of sensing routers SR21, SR22, SR23 and SR24 and a plurality of ground lines GL41, GL42, GL43 and GL44.

In an exemplary embodiment, the driving lines DL21, DL22, DL23, DL24 and DL25, the sensing lines SL21, SL22, SL23, SL24 and SL25, the first driving routers DR21, the second driving routers DR22, the sensing routers SR21, SR22, SR23 and SR24, and the ground lines GL41, GL42, GL43 and GL44 may be manufactured using a same mask. In Such an embodiment, the ground lines GL41, GL42, GL43 and GL44 and the sensing routers SR21, SR22, SR23 and SR24 may include a same material. In one exemplary embodiment, for example, the ground lines GL41, GL42, GL43 and GL44 and the sensing routers SR21, SR22, SR23 and SR24 may include an optically transparent and electrically conductive material such as ITO and IZO, for example.

In such an embodiment, the ground lines GL41, GL42, GL43 and GL44 and the sensing routers SR21, SR22, SR23 and SR24 may be provided on a same plan surface, e.g., a surface of a substrate.

The touch screen panel shown in FIG. 5 is substantially the same as the touch screen panel shown in FIG. 3 except for ground lines GL41, GL42, GL43 and GL44 disposed between the sensing and driving lines. The same or like elements shown in FIG. 5 have been labeled with the same reference characters as used above to describe the exemplary embodiment of the touch screen panel shown in FIG. 3, and any repetitive detailed description thereof will hereinafter be omitted or simplified.

In an exemplary embodiment, as shown in FIG. 5, the number of the ground lines disposed between the sensing line and the driving line may be four. In such an embodiment, a first ground line GL41 is disposed between a first sensing line SL21 and a second driving line DL22, and a touch pulse applied to the second driving line DL22 is thereby effectively prevented from being affected to a sensing signal sensed through the first sensing line SL21.

In such an embodiment, a second ground line GL42 is disposed between a second sensing line SL22 and a third driving line DL23, and a touch pulse applied to the third driving line DL23 is thereby effectively prevented from being affected to a sensing signal sensed through the second sensing line SL22.

In such an embodiment, a third ground line GL43 is disposed between a third sensing line SL23 and a fourth driving line DL24, and a touch pulse applied to the fourth driving line DL24 is thereby effectively prevented from being affected to a sensing signal sensed through the third sensing line SL23.

In such an embodiment, a fourth ground line GL44 is disposed between a fourth sensing line SL24 and a fifth driving line DL25, and a touch pulse applied to the fifth driving line DL25 is thereby effectively prevented from being affected to a sensing signal sensed through the fourth sensing line SL24.

Figure 6:
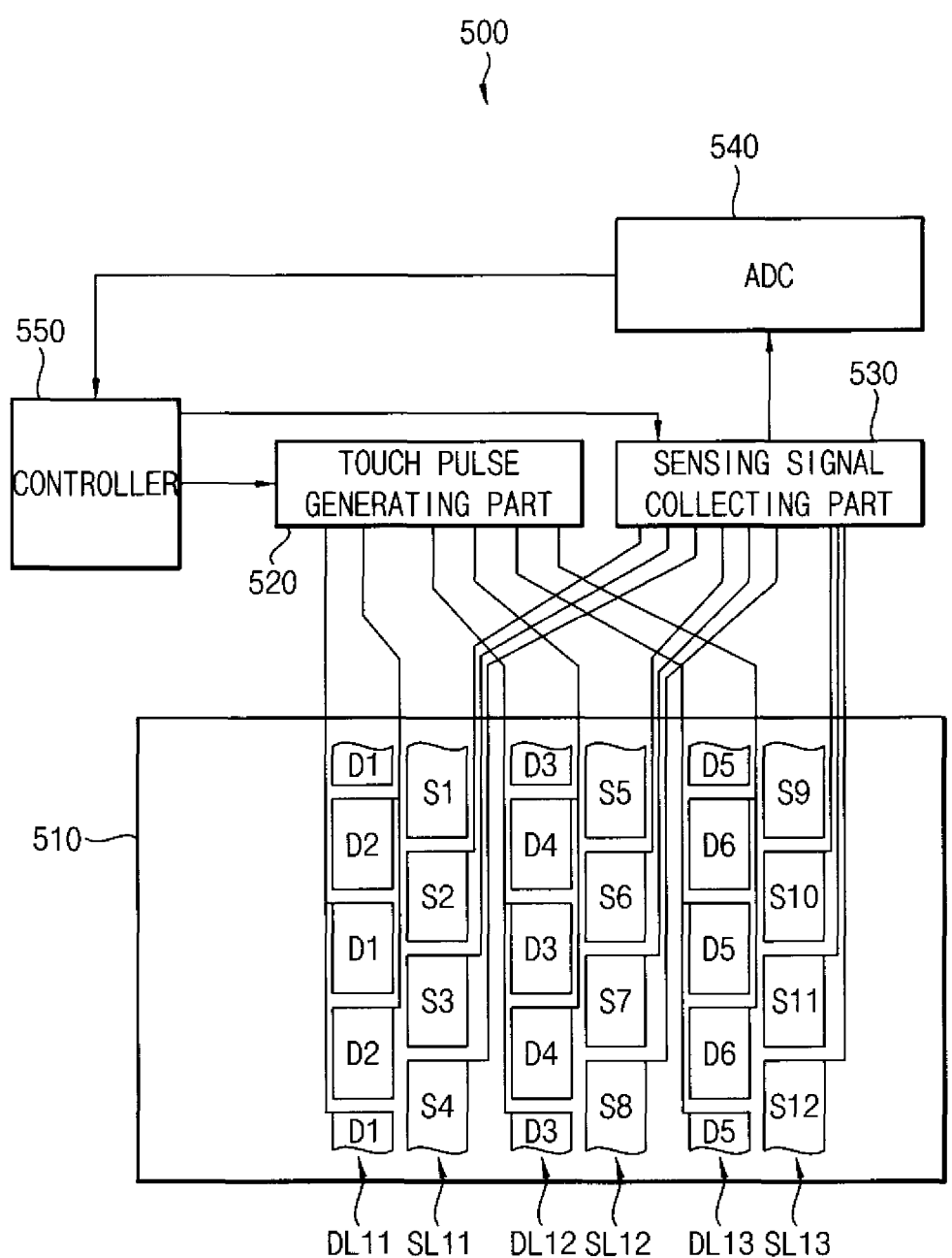
FIG. 6 is a block diagram schematically showing an exemplary embodiment of a touch sensing apparatus according to the invention.

FIG. 6 is a block diagram schematically showing an exemplary embodiment of a touch sensing apparatus according to the invention. In an exemplary embodiment, a touch sensing apparatus may include the touch screen panel shown in FIG. 1.

Referring to FIG. 6, an exemplary embodiment of a touch sensing apparatus according to the invention includes a touch screen panel 510, a touch pulse generating part 520, a sensing signal collecting part 530, an analog-digital converter ("ADC") 540 and a controller 550.

The touch screen panel 510 includes a plurality of driving lines DL11, DL12 and DL13, each of which includes a plurality of driving pads, a plurality of sensing lines SL11, SL12 and SL13, each of which includes a plurality of sensing pads, two driving routers connected to the driving lines DL11, DL12 and DL13, respectively, and a plurality of sensing routers connected to the sensing pads. The touch screen panel 510 may be one of the touch screen panel 100 of FIG. 1, the touch screen panel 200 of FIG. 3 and the touch screen panel 300 of FIG. 4. For convenience of illustration, three driving lines, three sensing lines, six driving routers and nine sensing routers are shown in FIG. 6.

In such an embodiment, a touch pulse (e.g., a driving voltage or a driving current) is applied to the driving lines for a touch operation, and a capacitor is provided in a peripheral of the sensing line adjacent to a corresponding driving line. When a touch means such as a body of a user or a touch pen, for example, approaches to the sensing line, charges flow from the capacitor such that strength of electric field is varied. The variation of the electric field is transmitted through the sensing line.

The touch pulse generating part 520 provides a plurality of touch pulses to the driving pads through the driving routers of the touch screen panel 510.

In an exemplary embodiment, the touch pulse generating part 520 may alternatively and sequentially output the touch pulses to the driving routers of the touch screen panel 510.

In such an embodiment, the touch pulse generating part 520 may apply a touch pulse to odd-numbered driving pads, and then may apply a touch pulse to even-numbered driving pads. In one exemplary embodiment, for example, the touch pulse generating part 520 may apply a first touch pulse to the odd-numbered driving pads respectively connected to the first to third driving lines DL11, DL12 and DL13, and then may apply a second touch pulse to the even-numbered driving pads respectively connected to the first to third driving lines DL11, DL12 and DL13. A high level interval of the first touch pulse does not overlap a high level interval of the second touch pulse.

In an alternative exemplary embodiment, the touch pulse generating part 520 may sequentially output the touch pulses to the driving routers of the touch screen panel 510.

In such an embodiment, the touch pulse generating part 520 may sequentially apply a touch pulse to even-numbered driving pads and odd-numbered driving pads disposed on driving lines. In one exemplary embodiment, for example, the touch pulse generating part 520 applies the first touch pulse to the even-numbered driving pads connected to a first driving line DL11, and then applies the second touch pulse to the odd-numbered driving pads connected to the first driving line DL11.

Then, in such an embodiment, the touch pulse generating part 520 may apply the first touch pulse to the even-numbered driving pads connected to a second driving line DL12, and then the touch pulse generating part 520 may apply the second touch pulse to the odd-numbered driving pads connected to the second driving line DL12.

Then, in such an embodiment, the touch pulse generating part 520 may apply the first touch pulse to the even-numbered driving pads connected to a third driving line DL13, and then the touch pulse generating part 520 may apply the second touch pulse to the odd-numbered driving pads connected to the third driving line DL13.

The sensing signal collecting part 530 simultaneously receives sensing signals from the sensing routers of the touch screen panel 510, and provides the ADC 540 with the received sensing signals.

In an exemplary embodiment, where the touch pulse generating part 520 alternatively and sequentially outputs the touch pulses, the sensing signal collecting part 530 receives a sensing signal from the sensing pads during a touch pulse interval.

In such an embodiment, during an interval that an even-numbered driving pad receives the first touch pulse and an interval that an odd-numbered driving pad receives the second touch pulse, the sensing signal collecting part 530 activates a connection of the sensing router to receive a sensing signal from all sensing pads. The sensing signal collecting part 530 is synchronized with the touch pulse generating part 520. The synchronization may be realized by controlling the controller 550.

In an exemplary embodiment, where the touch pulse generating part 520 sequentially outputs the touch pulses, the sensing signal collecting part 530 receives a sensing signal from sensing pads adjacent to a corresponding driving line during an interval, during which a touch pulse is applied to a predetermined driving line.

In such an embodiment, during the first and second touch pulses are applied to the first driving line DL11, the sensing signal collecting part 530 activates a connection of the sensing routers connected to a first sensing line SL11 to receive a sensing signal therefrom. Then, during the first and second touch pulses are applied to the second driving line DL12, the sensing signal collecting part 530 activates a connection of the sensing routers connected to a second sensing line SL12 to receive a sensing signal therefrom. Then, during the first and second touch pulses are applied to a third driving line DL13, the sensing signal collecting part 530 activates a connection of the sensing routers connected to the third sensing line SL13 to receive a sensing signal.

The sensing signal collecting part 530 may be a switch (e.g., a multiplexer ("MUX")) which is configured to perform a time-division multiplexing. The switch may receive the sensing signals from the sensing routers in parallel, and serializes the sensing signals to sequentially output the serialized sensing signals to the ADC 540.

The ADC 540 converts the sensing signals provided from the sensing signal collecting part 530 into a digital signal, and provides the controller 550 with the converted digital signal.

The controller 550 analyzes the converted digital signal to detect a position of the touch, e.g., a touch coordinate. A signal corresponding to the detected touch coordinate may be provided to an external host system (not shown), for example.

Figure 7:
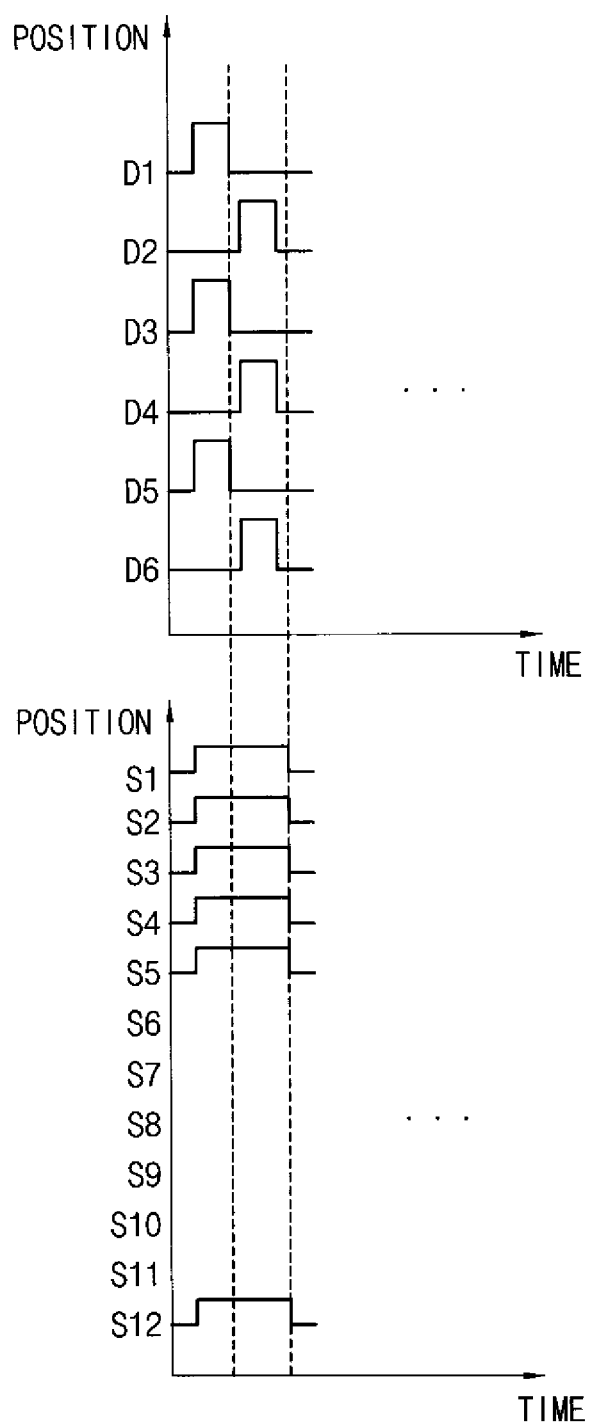
FIG. 7 is a signal timing diagram showing an exemplary embodiment of a driving method of the touch sensing apparatus of FIG. 6.

FIG. 7 is a signal timing diagram schematically showing an exemplary embodiment of a driving method of the touch sensing apparatus of FIG. 6.

Referring to FIGS. 6 and 7, after the first touch pulse is applied to the even-numbered driving pads, e.g., a first driving pad D1, of the first, second and third driving lines DL11, DL12 and DL13, the second touch pulse is applied to the odd-numbered driving pads, e.g., a second pad D2, of the first, second and third driving lines DL11, DL12 and DL13. In such an embodiment, the sensing signals are collected from the sensing pads S1, S2, S3 and S4 of the first sensing line SL11 adjacent to the first driving line DL11. Since each of the sensing pads S1, S2, S3 and S4 is independently connected to sensing routers, e.g., not being connected to each other, the sensing signals are simultaneously collected.

As described above, in an exemplary embodiment, where the first and second touch pulses are alternatively applied to the first driving pad D1 and a second driving pad D2 that are disposed at each of the first to third driving lines, a sensing signal is received from all sensing pads S1, S2, . . . , S12 such that a touch position is detected.

Figure 8:
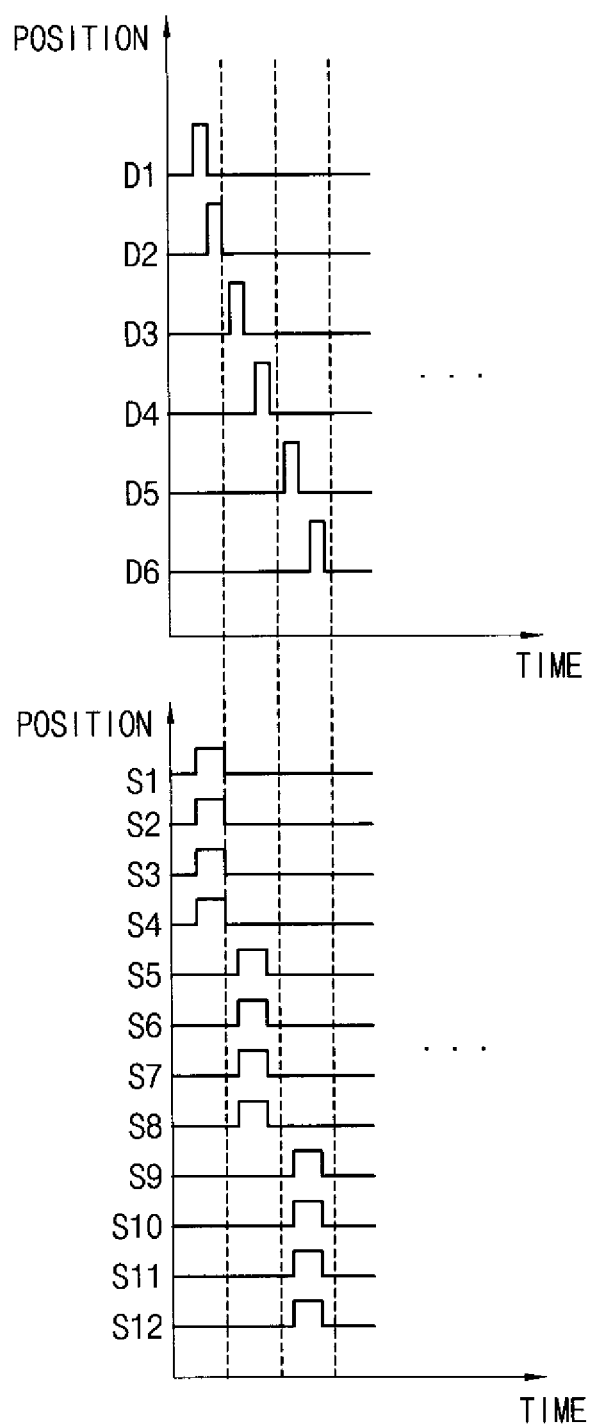
FIG. 8 is a signal timing diagram schematically showing an alternative exemplary embodiment of a driving method of the touch sensing apparatus of FIG. 6.

FIG. 8 is a signal timing diagram schematically showing an alternative exemplary embodiment of a driving method of the touch sensing apparatus of FIG. 6.

Referring to FIGS. 6 and 8, after a touch pulse is applied to the even-numbered driving pads, e.g., the first driving pad D1, of the first driving line DL11, a touch pulse is applied to the odd-numbered driving pads, e.g., the second driving pad D2, of the first driving line DL11. In such an embodiment, the sensing signals are collected from each of the sensing pads S1, S2, S3 and S4 of the first sensing line SL11 adjacent to the first driving line DL11. Since each of the sensing pads S1, S2, S3 and S4 is independently connected to the sensing routers, the sensing signals are simultaneously collected.

Then, after a touch pulse is applied to the even-numbered driving pads, e.g., a third driving pad D3, of the second driving line DL12, a touch pulse is applied to the odd-numbered driving pads D4 of the second driving line DL12. In such an embodiment, the sensing signals are collected from each of the sensing pads S5, S6, S7 and S8 of the second sensing line SL12 adjacent to the second driving line DL12. Since each of the sensing pads S5, S6, S7 and S8 is independently connected to the sensing routers, the sensing signals are simultaneously collected.

Then, after a touch pulse is applied to the even-numbered driving pads, e.g., a fifth driving pad D5, of the third driving line DL13, a touch pulse is applied to the odd-numbered driving pads, e.g., a sixth driving pad D6, of the third driving line DL13. In such an embodiment, the sensing signals are collected from each of the sensing pads S9, S10, S11 and S12 of the third sensing line SL13 adjacent to the third driving line DL13. Since each of the sensing pads S9, S10, S11 and S12 is independently connected to the sensing routers, the sensing signals are simultaneously collected.

As described above, when a touch pulse is applied to the first driving pad D1 and the second driving pad D2, a sensing signal is received from the first to fourth sensing pads S1, S2, S3 and S4 such that a touch position is detected. In such an embodiment, when a touch pulse is applied to the third driving pad D3 and the fourth driving pad D4, a sensing signal is received from the fifth to eighth sensing pads S5, S6, S7 and S8 such that a touch position is detected. In such an embodiment, when a touch pulse is applied to the fifth driving pad D5 and the sixth driving pad D6, a sensing signal is received from the ninth to twelfth sensing pads S9, S10, S11 and S12 such that a touch position is detected. In such an embodiment, the first to sixth driving pads D1, D2, D3, D4, D5 and D6 are sequentially driven in a time-division manner.

Figure 9:
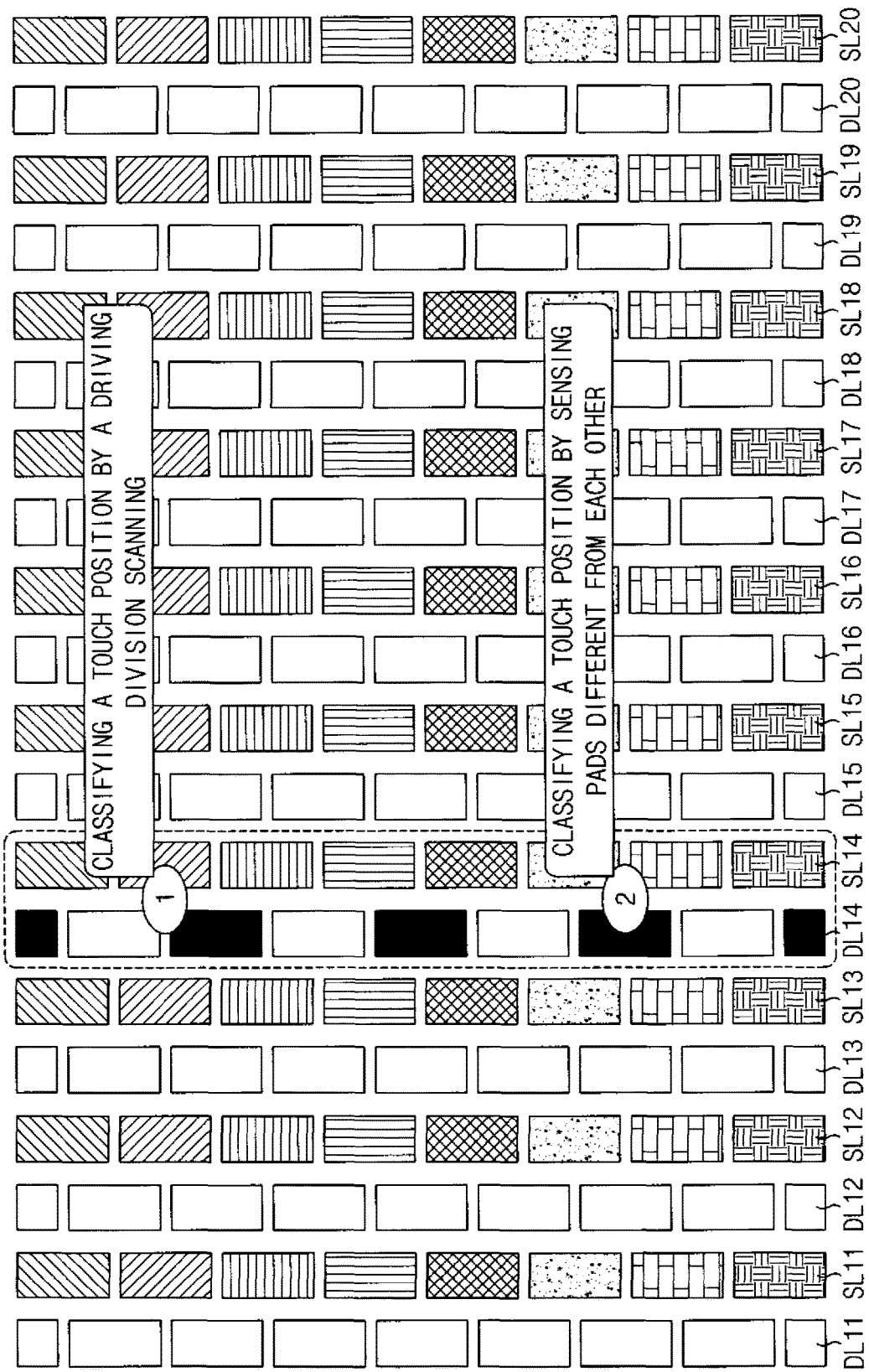
FIG. 9 is a plan view schematically showing an exemplary embodiment of a touch position determining method in a touch screen panel according to the invention.

FIG. 9 is a plan view schematically showing an exemplary embodiment of a touch position determining method in a touch screen panel.

Referring to FIG. 9, a first point 1 between the different driving pads and a single sensing pad may be touched, or a second point 2 between a signal driving pad and different sensing pads may be touched.

The first point 1 may be detected based on a touch position by a driving division scanning, and the second point 2 may be detected based on a touch position by the different sensing pads.

Figure 10:
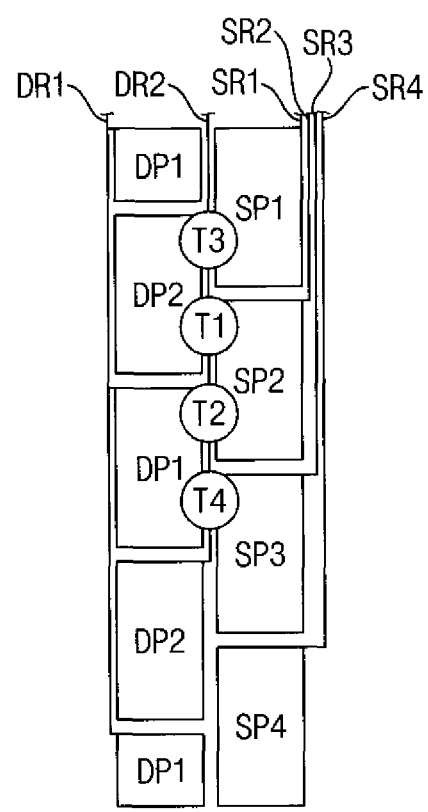
FIG. 10 is a plan view of an exemplary embodiment of a sensor for a touch operation performed on a touch screen panel according to the invention.

FIG. 10 is a plan view showing an exemplary embodiment of a sensor for a touch operation performed on a touch screen panel.

Referring to FIG. 10, a first driving pad DP1 and a second driving pad DP2 are disposed on a driving line. The first driving pad DP1 is connected to a first driving router DR1 to receive a first touch pulse, and the second driving pad DP2 is connected to a second driving router DR2 to receive a second touch pulse.

A first sensing pad SP1, a second sensing pad SP2, a third sensing pad SP3 and a fourth sensing pad SP4 are disposed on a sensing line. The first sensing pad SP1 is connected to a first sensing router SR1 to provide the first sensing router SR1 with a sensing signal. The second sensing pad SP2 is connected to a second sensing router SR2 to provide the second sensing router SR2 with a sensing signal. The third sensing pad SP3 is connected to a third sensing router SR3 to provide the third sensing router SR3 with a sensing signal. The fourth sensing pad SP4 is connected to a fourth sensing router SR4 to provide the fourth sensing router SR4 with a sensing signal.

In an exemplary embodiment, as shown in FIG. 10, a touch position may be sensed when a touch that occurs at various positions. In such an embodiment, when a touch occurs at a first touch area T1 between the second driving pad DP2 and the second sensing pad SP2, a touch position may be sensed based in a capacitance variation amount, which will be described later in greater detail referring to FIG. 11A.

In such an embodiment, when a touch occurs at a second touch area T2 between the first driving pad DP1 and the second sensing pad SP2, a touch position may be sensed based in a capacitance variation amount, which will be described later in greater detail referring to FIG. 11B.

In such an embodiment, when a touch occurs at a third touch area T3 between the second driving pad DP2 and the first sensing pad SP1, a touch position may be sensed based in a capacitance variation amount, which will be described later in greater detail referring to FIG. 11C.

In such an embodiment, when a touch occurs at a fourth touch T4 area between the first driving pad DP1 and the third sensing pad SP3, a touch position may be sensed based in a capacitance variation amount, which will be described later in greater detail referring to FIG. 11D.

Figure 11A:
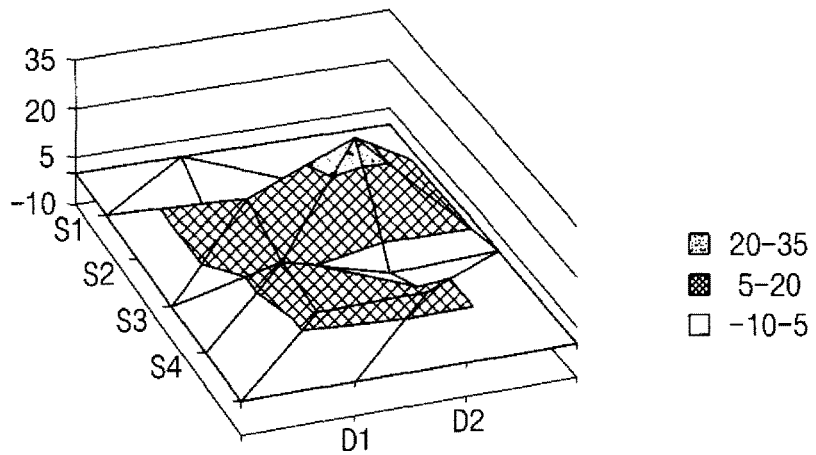
FIG. 11A is a graph showing a variation amount of capacitance when a touch occurs between a second driving pad and a second sensing pad of FIG. 10.

FIG. 11A is a graph showing a variation amount of capacitance when a touch occurs between the second driving pad DP2 and the second sensing pad SP2 of FIG. 10.

Referring to FIG. 11A, a capacitance variation amount of about −11.93% was sensed between the first driving pad DP1 and the first sensing pad SP1, and a capacitance variation amount of about 12.91% was sensed between the first driving pad DP1 and the second sensing pad SP2. A capacitance variation amount of about 7.56% was sensed between the first driving pad DP1 and the third sensing pad SP3, and a capacitance variation amount of about 6.23% was sensed between the first driving pad DP1 and the fourth sensing pad SP4.

As shown in FIG. 11A, a capacitance variation amount of about −1.20% was sensed between the second driving pad DP2 and the first sensing pad SP1. A capacitance variation amount of about 25.94% was sensed between the second driving pad DP2 and the second sensing pad SP2. A capacitance variation amount of about −0.90% was sensed between the second driving pad DP2 and the third sensing pad SP3. A capacitance variation amount of about 7.19% was sensed between the second driving pad DP2 and the fourth sensing pad SP4.

In such an embodiment, a touch position is determined based on the capacitance variation amount. As shown in FIG. 11A, a touch is detected between the second driving pad DP2 and the second sensing pad SP2, between which the capacitance variation amount corresponds to about 25.95% that is the greatest of the sensed capacitance variation amounts between the driving pads.

Accordingly, a touch coordinate may be detected based on the capacitance variation amount between the driving pads and the sensing pads when a touch occurs between the second driving pad DP2 and the second sensing pad SP2.

Figure 11B:
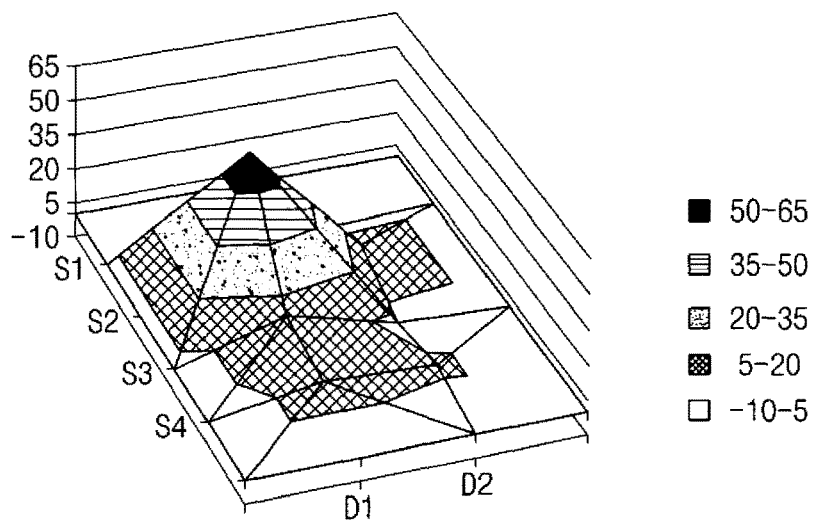
FIG. 11B is a graph showing a variation amount of capacitance when a touch occurs between a first driving pad and a first sensing pad of FIG. 10.

FIG. 11B is a graph showing a variation amount of capacitance when a touch occurs between the first driving pad DP1 and the first sensing pad SP1 of FIG. 10.

Referring to FIG. 11B, a capacitance variation amount of about −8.49% was sensed between a first driving pad DP1 and a first sensing pad SP1, and a capacitance variation amount of about 61.81% was sensed between the first driving pad DP1 and the second sensing pad SP2. A capacitance variation amount of about 14.19% was sensed between the first driving pad DP1 and the third sensing pad SP3. A capacitance variation amount of about 8.42% was sensed between the first driving pad DP1 and the fourth sensing pad SP4.

As shown in FIG. 11B, a capacitance variation amount of about −1.71% was sensed between the second driving pad DP2 and the first sensing pad SP1. A capacitance variation amount of about 13.24% was sensed between the second driving pad DP2 and the second sensing pad SP2. A capacitance variation amount of about 2.21% was sensed between the second driving pad DP2 and the third sensing pad SP3. A capacitance variation amount of about 6.27% was sensed between the second driving pad DP2 and the fourth sensing pad SP4.

In such an embodiment, a touch position is determined based on the capacitance variation amount. As shown in FIG. 11B, a touch is detected between the first driving pad DP1 and the second sensing pad SP2, between which the capacitance variation amount corresponds to the 61.81% that is the greatest of the sensed capacitance variation amounts.

Accordingly, a touch coordinate may be detected based on the capacitance variation amount between the driving pads and the sensing pads when a touch is generated between the first driving pad DP1 and the second sensing pad SP2.

Figure 11C:
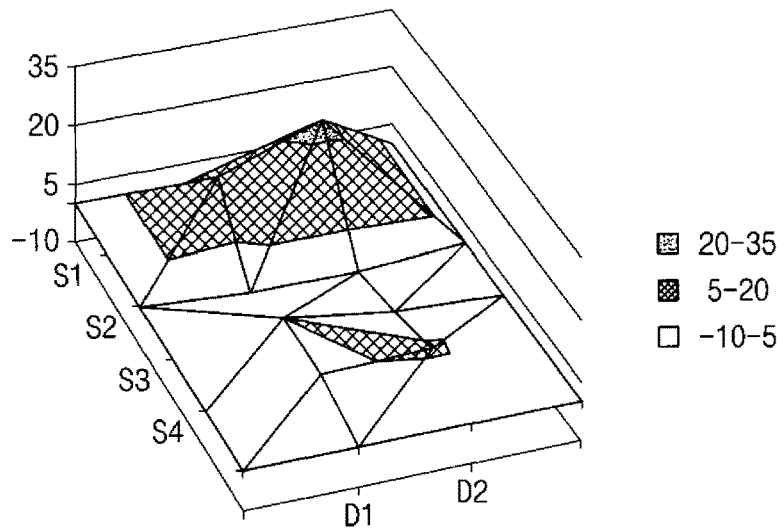
FIG. 11C is a graph showing a variation amount of capacitance when a touch occurs between a second driving pad and a first sensing pad of FIG. 10.

FIG. 11C is a graph showing a variation amount of a capacitance when a touch occurs between the second driving pad DP2 and the first sensing pad SP1 of FIG. 10.

Referring to FIG. 11C, a capacitance variation amount of about 13.54% was sensed between the first driving pad DP1 and the first sensing pad SP1, and a capacitance variation amount of about −1.82% was sensed between the first driving pad DP1 and the second sensing pad SP2. A capacitance variation amount of about 5.01% was sensed between the first driving pad DP1 and the third sensing pad SP3. A capacitance variation amount of about 4.31% was sensed between the first driving pad DP1 and the fourth sensing pad SP4.

As shown in FIG. 11C, a capacitance variation amount of about 23.68% was sensed between the second driving pad DP2 and the first sensing pad SP1. A capacitance variation amount of about −2.03% was sensed between the second driving pad DP2 and the second sensing pad SP2. A capacitance variation amount of about 0.88% was sensed between the second driving pad DP2 and the third sensing pad SP3. A capacitance variation amount of about 5.69% was sensed between the second driving pad DP2 and the fourth sensing pad SP4.

In such an embodiment, a touch position is determined based on the capacitance variation amount. As shown in FIG. 11C, a touch is detected between the second driving pad DP2 and the first sensing pad SP1, between which the capacitance variation amount corresponds to the 23.68% that is the greatest of the sensed capacitance variation amounts.

Accordingly, a touch coordinate may be detected based on the capacitance variation amount between the driving pads and the sensing pads when a touch occurs between the second driving pad DP2 and the first sensing pad SP1.

Figure 11D:
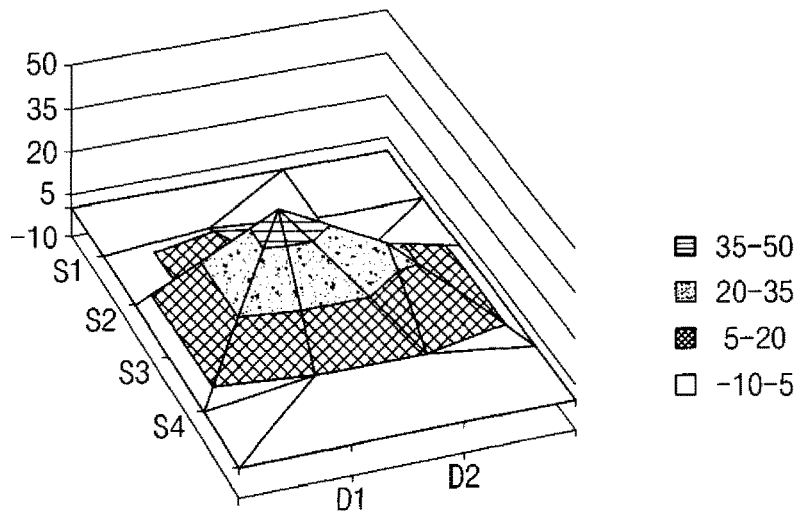
FIG. 11D is a graph showing a variation amount of capacitance when a touch occurs between a first driving pad and a third sensing pad of FIG. 10.

FIG. 11D is a graph showing a variation amount of a capacitance when a touch occurs between the first driving pad DP1 and the third sensing pad SP3 of FIG. 10.

Referring to FIG. 11D, a capacitance variation amount of about 3.33% was sensed between the first driving pad DP1 and the first sensing pad SP1, and a capacitance variation amount of about 13.55% was sensed between the first driving pad DP1 and the second sensing pad SP2. A capacitance variation amount of about 43.69% was sensed between the first driving pad DP1 and the third sensing pad SP3. A capacitance variation amount of about 4.85% was sensed between the first driving pad DP1 and the fourth sensing pad SP4.

As shown in FIG. 11D, a capacitance variation amount of about −0.24% was sensed between the second driving pad DP2 and the first sensing pad SP1. A capacitance variation amount of about 1.74% was sensed between the second driving pad DP2 and the second sensing pad SP2. A capacitance variation amount of about 17.90% was sensed between the second driving pad DP2 and the third sensing pad SP3. A capacitance variation amount of about 4.65% was sensed between the second driving pad DP2 and the fourth sensing pad SP4.

In such an embodiment, a touch position is determined based on the capacitance variation amount. As shown in FIG. 11D, a touch is detected between the first driving pad DP1 and the third sensing pad SP3, between which the capacitance variation amount corresponds to the 43.69% that is the greatest of the sensed capacitance variation amounts.

In such an embodiment, a touch coordinate may be detected based on the capacitance variation amount between the driving pads and the sensing pads when a touch is generated between the first driving pad DP1 and the third sensing pad SP3.

Hereinafter, RC delay according to a line width of a sensing router and a line interval of a sensing router in a comparative embodiment of a touch screen panel and an exemplary embodiment of a touch screen panel will be described.

In an exemplary embodiment, RC delay may be calculated using the following Equation 1.

$$R=(TxPad+RxPad+TxRouter+RxRouter)$$

$$C=(TxPad+RxPad+TxRouter+RxRouter+Cm) \quad \text{[Equation 1]}$$

In Equation 1, TxPad denotes a driving pad, RxPad denotes a sensing pad, TxRouter denotes a driving router, RxRouter denotes a sending router, and Cm denotes a capacitance generated based on a touch of a user.

In Equation 1, Cm is a capacitance which is considered when a touch is generated. However, it is assumed that a capacitance generated based on a touch in the comparative embodiment is substantially equal to a capacitance generated based on a touch an exemplary embodiment, such that Cm will not be considered.

Generally, capacitance is defined by the following Equation 2.

$$C = \varepsilon \frac{A}{d} \quad \text{[Equation 2]}$$

In Equation 2, '$\varepsilon$' denotes permittivity of a dielectric layer disposed between two electrodes, 'A' denotes a size of two electrodes, and denotes an interval between two electrodes. Hereinafter, the permittivity or the interval between two electrodes of a capacitor in the comparative embodiment is substantially equal to the permittivity or the interval between two electrodes of a capacitor in an exemplary embodiment, such that a size of two electrodes will be considered.

Figure 12A:
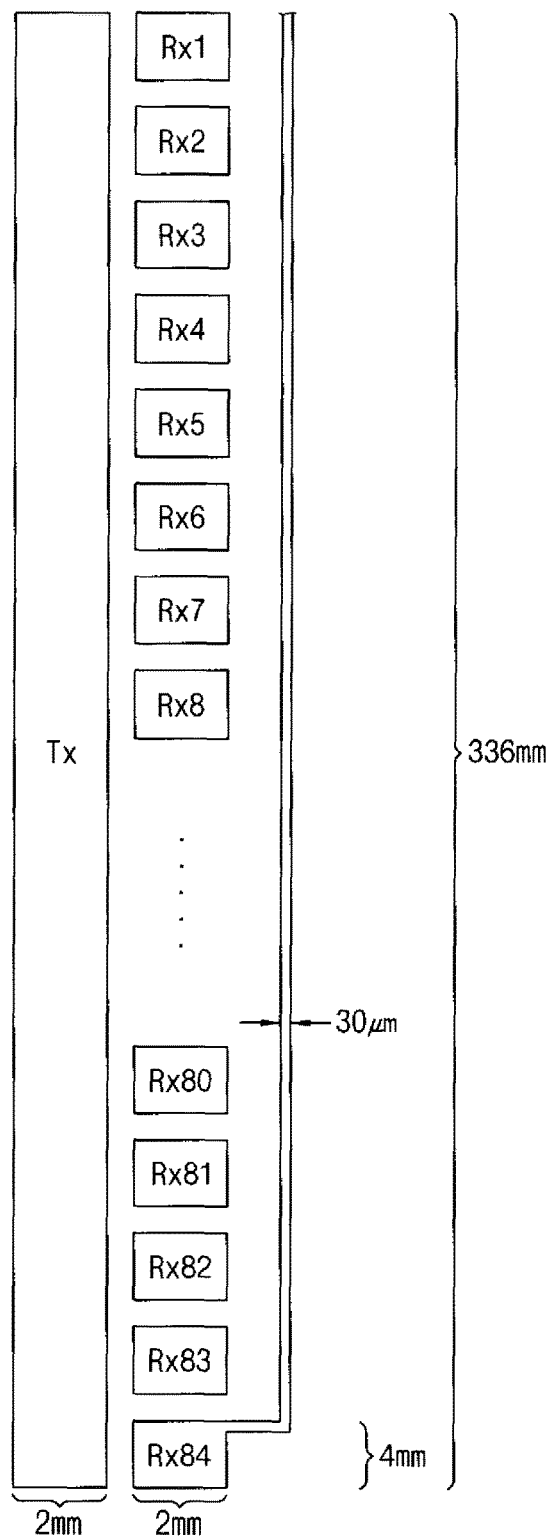
FIG. 12A is a plan view of an comparative embodiment of a unit touch sensor of a touch screen panel.
Figure 12B:
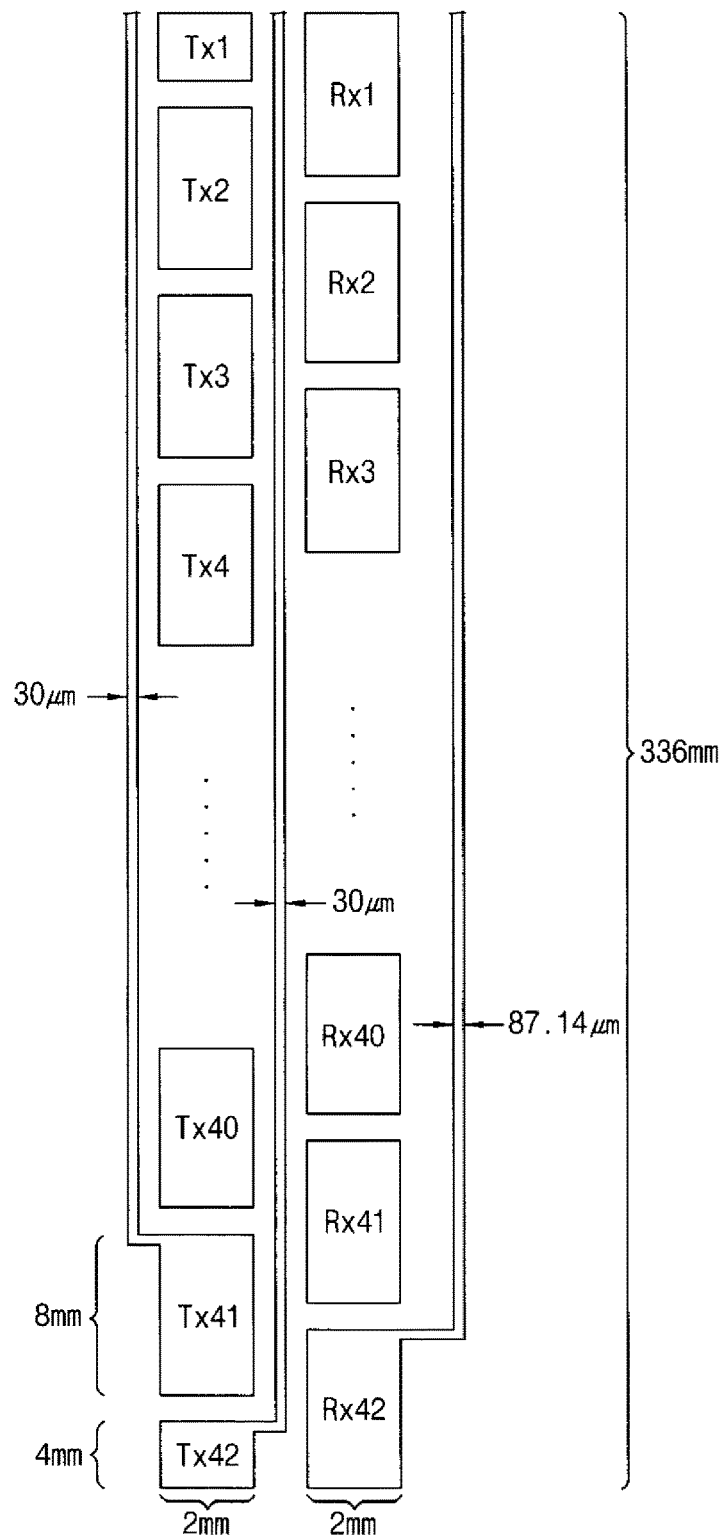
FIG. 12B is a plan view of an exemplary embodiment of a unit touch sensor of a touch screen panel according to the invention.

FIG. 12A is a plan view of a unit touch sensor of the comparative embodiment of a touch screen panel. FIG. 12B is a plan view of a unit touch sensor of an exemplary embodiment of a touch screen panel. As shown in FIGS. 12A and 12B, embodiments where the unit pixel includes one driving line and one sensing line will be described.

According to the comparative embodiment of FIG. 12A, one driving pad Tx is disposed at one driving line, and eighty-four sensing pads Rx1, Rx2, Rx83 and Rx84 are disposed at one sensing line. In the comparative embodiment of FIG. 12A, the driving pad and the sensing pad have a size of about 2 mm×4 mm. A sensing router has a line width of about 30 micrometers (μm).

According to the exemplary embodiment of FIG. 12B, forty-two driving pads Tx1, Tx2, . . . , Tx41 and Tx42 are disposed at one driving line, and forty-two sensing pads Rx1, Rx2, Rx41 and Rx42 are disposed at one sensing line. In such an embodiment, the first driving pad Tx1 and the last driving pad Tx42 have a size of about 2 mm×4 mm. The remaining driving pads Tx2, Tx3, Tx40 and Tx41 have a size of 2 mm×8 mm. Each driving routers has a line width of about 30 μm, and each sensing routers has a line width of about 87.14 μm.

In such an embodiment, a line width of a router is increased at least two times, considering a line interval between routers. Accordingly, the line width may be increased to about 87 μm from about 30 μm.

According to the comparative embodiment of FIG. 12A, since sensing routers are disposed thereon, a line width of routers may be calculated as [84(30+30)].

According to the exemplary embodiment of FIG. 12B, the driving routers and sensing routers are disposed thereon. Thus, a line width of routers in the exemplary embodiment of FIG. 12B is a summation of a line width of driving routers and a line width of sensing routers. That is, a line width in the exemplary embodiment of FIG. 12B may be calculated as [2(30+30)]+[42(87+30)].

Hereinafter, RC delay in the comparative embodiment of FIG. 12A and the exemplary embodiment of FIG. 12B will be described based on a capacitance ratio of the comparative embodiment of FIG. 12A and the exemplary embodiment of FIG. 12B summarized in the following Table 3, and a resistance ratio of the comparative embodiment of FIG. 12A and the exemplary embodiment of FIG. 12B summarized in the following Table 4.

TABLE 3

| | Calculation of capacitance ratio | | | | | |
|---|---|---|---|---|---|---|
| | TxPad | TxRouter | RxPad | RxRouter | Summation | Ratio (Exemplary Embodiment/ Comparative Embodiment) |
| Comparative Embodiment | 672 | 0 | 8 | 9.96 | 689.96 | 0.559 |
| Exemplary Embodiment | 336 | 5.04 | 16 | 28.58 | 385.62 | |

TABLE 4

| | TxPad | TxRouter | RxPad | RxRouter | Summation | Ratio (Exemplary Embodiment/ Comparative Embodiment) |
|---|---|---|---|---|---|---|
| Calculation of resistance ratio | | | | | | |
| Comparative Embodiment | 168 | 0 | 2 | 11066.67 | 11236.67 | 0.841 |
| Exemplary Embodiment | 84 | 5600 | 4 | 3764.06 | 9462.06 | |

Referring to Table 3 and Table 4, the RC delay according to the exemplary embodiment of FIG. 12B is about 47% (i.e., 0.559×0.841) of the RC delay in the comparative embodiment of FIG. 12A.

According to the exemplary embodiment of FIG. 12B, each widths of forty-two sensing routers is decreased to about 60 μm from about 87.14 μm; however, each widths of two driving routers is increased to 570 μm from about 30 μm (i.e., {(87.14-60)42}/2=570).

In an alternative exemplary embodiment, a line width of a sensing router may be about 60 μm and a line width of a driving router may be about 570 μm, and RC delay in such an embodiment will be hereinafter described.

Hereinafter, RC delay in the comparative embodiment and the alternative exemplary embodiment will be described based on a capacitance ratio of the comparative embodiment and the alternative exemplary embodiment summarized in the following Table 5, and a resistance ratio of the comparative embodiment and the alternative exemplary embodiment summarized in the following Table 6.

TABLE 5

| | TxPad | TxRouter | RxPad | RxRouter | Summation | Ratio (Exemplary Embodiment/ Comparative Embodiment) |
|---|---|---|---|---|---|---|
| Calculation of capacitance ratio | | | | | | |
| Comparative Embodiment | 672 | 0 | 8 | 9.96 | 689.96 | 0.677 |
| Exemplary Embodiment 2 | 336 | 95.76 | 16 | 19.68 | 467.44 | |

TABLE 6

| | TxPad | TxRouter | RxPad | RxRouter | Summation | Ratio (Exemplary Embodiment/ Comparative Embodiment) |
|---|---|---|---|---|---|---|
| Calculation of resistance ratio | | | | | | |
| Comparative Embodiment | 168 | 0 | 2 | 11066.67 | 11236.67 | 0.521 |
| Exemplary Embodiment 2 | 84 | 294.74 | 4 | 5466.67 | 5849.40 | |

Referring to Table 5 and Table 6, the RC delay in the alternative exemplary embodiment is about 35.26% (i.e., 0.667×0.521) of the RC delay in the comparative embodiment.

As described above, according to exemplary embodiments of the invention, different driving lines are provided for even-numbered touch driving units and odd-numbered touch driving units such that the even-numbered touch driving units and the odd-numbered touch driving units receive different touch pulses. In exemplary embodiments, the touch sensing units and the touch driving units, which are disposed at sensing lines and the driving line, respectively, are disposed in a zigzag pattern such that the number of sensing routers connected to sensing lines adjacent to the driving lines is substantially decreased.

As the number of the sensing routers is decreased, a line resistance is decreased, thereby substantially reducing the RC delay. As the RC delay is reduced, a charging time is decreased such that a touch response is substantially improved. In exemplary embodiments, as the number of sensing routers is decreased, a parasitic capacitance and noise are substantially reduced, thereby enhancing touch accuracy.

While the invention has been particularly shown and described with reference to exemplary embodiments thereof, it is further noted that it is readily apparent to those of reasonable skill in the art that various modifications may be made without departing from the spirit and scope of the invention which is defined by the metes and bounds of the appended claims.

What is claimed is:

1. A sensing structure comprising:
   a plurality of first electrodes arranged along a first direction;
   a plurality of second electrodes arranged along the first direction and spaced apart from the first electrodes;
   a plurality of first routers disposed adjacent to the first electrodes, each of the first routers being connected to a respective one of the first electrodes;
   at least one second router parallel to the first routers, disposed adjacent to first sides of the second electrodes and connected to a first part of the second electrodes; and
   at least one third router parallel to the first routers, disposed adjacent to second sides of the second electrodes opposite to the first sides of the second electrodes and connected to a second part of the second electrodes,
   wherein two adjacent first electrodes are disposed to correspond with one second electrode,
   wherein, during a first period, a first touch pulse is applied to odd-numbered second electrodes among the plurality of second electrodes through the second router,
   wherein, during a second period subsequent to the first period, a second touch pulse is applied to even-numbered second electrodes among the plurality of second electrodes through the third router, and
   wherein, during both the first period and the second period, sensing signals are simultaneously collected from the plurality of first electrodes.

2. The sensing structure of claim 1, wherein an end of one of the first electrodes corresponds with a center portion of one of the second electrodes in the first direction.

3. The sensing structure of claim 1, wherein two adjacent second electrodes are disposed to correspond with one first electrode.

4. The sensing structure of claim 3, wherein an end of one of the second electrodes corresponds with a center portion of one of the first electrodes in the first direction.

5. The sensing structure of claim 1, wherein the second electrodes do not overlap the first electrodes in the first direction.

6. The sensing structure of claim 1, wherein the first electrodes are interposed between the first routers and the second router in a plan view.

7. The sensing structure of claim 6, wherein the second electrodes are interposed between the second router and the third router in the plan view.

8. The sensing structure of claim 1, wherein the second router is connected to one of an even-numbered second electrode and an odd-numbered second electrode of the second electrodes,
   wherein the third router is connected to the other of the even-numbered second electrode and the odd-numbered second electrode of the second electrodes.

9. The sensing structure of claim 1,
   wherein at least one of plurality of the first electrodes includes a first pad and a first bridge, and
   wherein a width of the first bridge is substantially narrower than that of the first pad.

10. The sensing structure of claim 1, wherein each of the second electrodes comprises two second pads electrically connected to each other.

11. The sensing structure of claim 10, wherein the second pads are connected to each other through a second bridge.

12. The sensing structure of claim 11, wherein a width of the second bridge is substantially narrower than that of the second pad.

13. The sensing structure of claim 1, wherein the first electrodes, the second electrodes, the first routers, the second router and the third router are disposed in a same layer.

14. The sensing structure of claim 1, wherein each of the first electrodes comprises two first pads electrically connected to each other, and the first pads are connected to each other through a first bridge.

15. The sensing structure of claim 1, wherein a number of the second router is the same as a number of the third router.

16. A touch sensing apparatus comprising:
   a sensing structure comprising:
      a plurality of first electrodes arranged along a first direction;
      a plurality of second electrodes arranged along the first direction and spaced apart from the first electrodes;
      a plurality of first routers disposed adjacent to the first electrodes, each of the first routers being connected to a respective one of the first electrodes;
      at least one second router parallel to the first routers, disposed adjacent to first sides of the second electrodes and connected to a first part of the second electrodes; and
      at least one third router parallel to the first routers, disposed adjacent to second sides of the second electrodes opposite to the first sides of the second electrodes and connected to a second part of the second electrodes,
   wherein two adjacent first electrodes are disposed to correspond with one second electrode,
   wherein a touch pulse generating part which provides a first touch pulse and a second touch pulse to the second router and the third router, respectively, wherein, during a first period, the first touch pulse is applied to odd- numbered second electrodes among the plurality of second electrodes through the second router, wherein, during a second period subsequent to the first period, the second touch pulse is applied to even- numbered second electrodes among the plurality of second electrodes through the third router, and wherein, during both the first period and the second period, sensing signals are simultaneously collected from the plurality of first electrodes.

* * * * *